US012669565B2

(12) United States Patent　　　　(10) Patent No.: US 12,669,565 B2

Hirzallah et al.　　　　　　　　　　　(45) Date of Patent: Jun. 30, 2026

(54) BEAM SQUINT PROFILING, INDICATION, AND REPORTING FOR POSITIONING AND SENSING

(71) Applicant: QUALCOMM Incorporated, San Diego, CA (US)

(72) Inventors: Mohammed Ali Mohammed Hirzallah, San Diego, CA (US); Marwen Zorgui, San Diego, CA (US); Srinivas Yerramalli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 563 days.

(21) Appl. No.: 18/161,797

(22) Filed: Jan. 30, 2023

(65) Prior Publication Data

US 2024/0255602 A1　Aug. 1, 2024

(51) Int. Cl.
| | |
|---|---|
| *G01S 5/02* | (2010.01) |
| *G01S 5/00* | (2006.01) |
| *G01S 5/04* | (2006.01) |
| *G01S 5/08* | (2006.01) |

(52) U.S. Cl.
CPC .......... *G01S 5/0036* (2013.01); *G01S 5/0063* (2013.01); *G01S 5/0236* (2013.01); *G01S 5/04* (2013.01); *G01S 5/08* (2013.01)

(58) Field of Classification Search
CPC .... G01S 5/0236; G01S 5/0036; G01S 5/0063; G01S 5/04; G01S 5/08; G01S 5/0018; G01S 5/0081; G01S 1/024; G01S 1/026; G01S 1/08; H04B 7/06952; H04B 7/0628; H04B 7/088

USPC ................................ 342/451, 450, 367, 350
See application file for complete search history.

(56) References Cited

U.S. PATENT DOCUMENTS

| | | | | |
|---|---|---|---|---|
| 10,819,405 B2 * | 10/2020 | Cai | ...................... | H04B 7/0617 |
| 11,496,194 B2 * | 11/2022 | Hirzallah | ............. | H04B 7/0857 |
| 11,621,754 B2 * | 4/2023 | Aghajanzadeh | ..... | H04B 7/0617 375/267 |

(Continued)

FOREIGN PATENT DOCUMENTS

| | | | | |
|---|---|---|---|---|
| EP | 3968535 A1 * | 3/2022 | ......... | H04B 7/06952 |
| KR | 102172378 B1 * | 10/2020 | ......... | G01S 13/9041 |
| WO | WO-2022192823 A1 * | 9/2022 | ........... | G01S 5/0036 |

OTHER PUBLICATIONS

International Search Report and Written Opinion—PCT/US2024/012246—ISA/EPO—May 23, 2024.

*Primary Examiner* — Chuong P Nguyen
(74) *Attorney, Agent, or Firm* — Procopio, Cory, Hargreaves & Savitch LLP

(57) ABSTRACT

Aspects presented herein may enable a network node (e.g., a UE, a TRP/base station) to provide its beam squint information and/or to receive beam squint information of another positioning entity to improve the accuracy and reliability of UE positioning. In one aspect, a network node obtains beam squint information associated with a set of beams of the network node under a plurality of center frequencies. The network node transmits, for a network entity, the beam squint information for at least one beam of the set of beams for a positioning session. The network entity participates, based on the beam squint information via the at least one beam, in the positioning session with the network entity.

19 Claims, 29 Drawing Sheets

2400

(56) References Cited

U.S. PATENT DOCUMENTS

| 11,792,666 B2 * | 10/2023 | Akkarakaran | ...... | H04W 64/006 |
| | | | | 455/456.1 |
| 11,843,993 B2 * | 12/2023 | Hirzallah | ............... | G06N 3/096 |
| 12,284,011 B2 * | 4/2025 | Li | ......................... | H04B 7/0671 |
| 12,328,166 B2 * | 6/2025 | Tiirola | ................. | H04B 7/0617 |
| 2020/0145977 A1 * | 5/2020 | Kumar | .................. | G01S 5/0063 |
| 2021/0385678 A1 | 12/2021 | Akkarakaran et al. | | |
| 2022/0167342 A1 | 5/2022 | Raghavan et al. | | |
| 2022/0200681 A1 | 6/2022 | Raghavan et al. | | |
| 2022/0320727 A1 * | 10/2022 | Molla Aghajanzadeh | .................. | |
| | | | | H01Q 3/2694 |
| 2024/0276418 A1 * | 8/2024 | Duan | .................... | G01S 7/2813 |

* cited by examiner $\Phi$ = Azimuth angle of departure (A-AoD)
$\theta$ = Zenith angle of departure (Z-AoD)
$\rho$ = Distance
$\Phi'$ = Azimuth angle of arrival (A-AoA)
$\theta'$ = Zenith angle of arrival (Z-AoA)

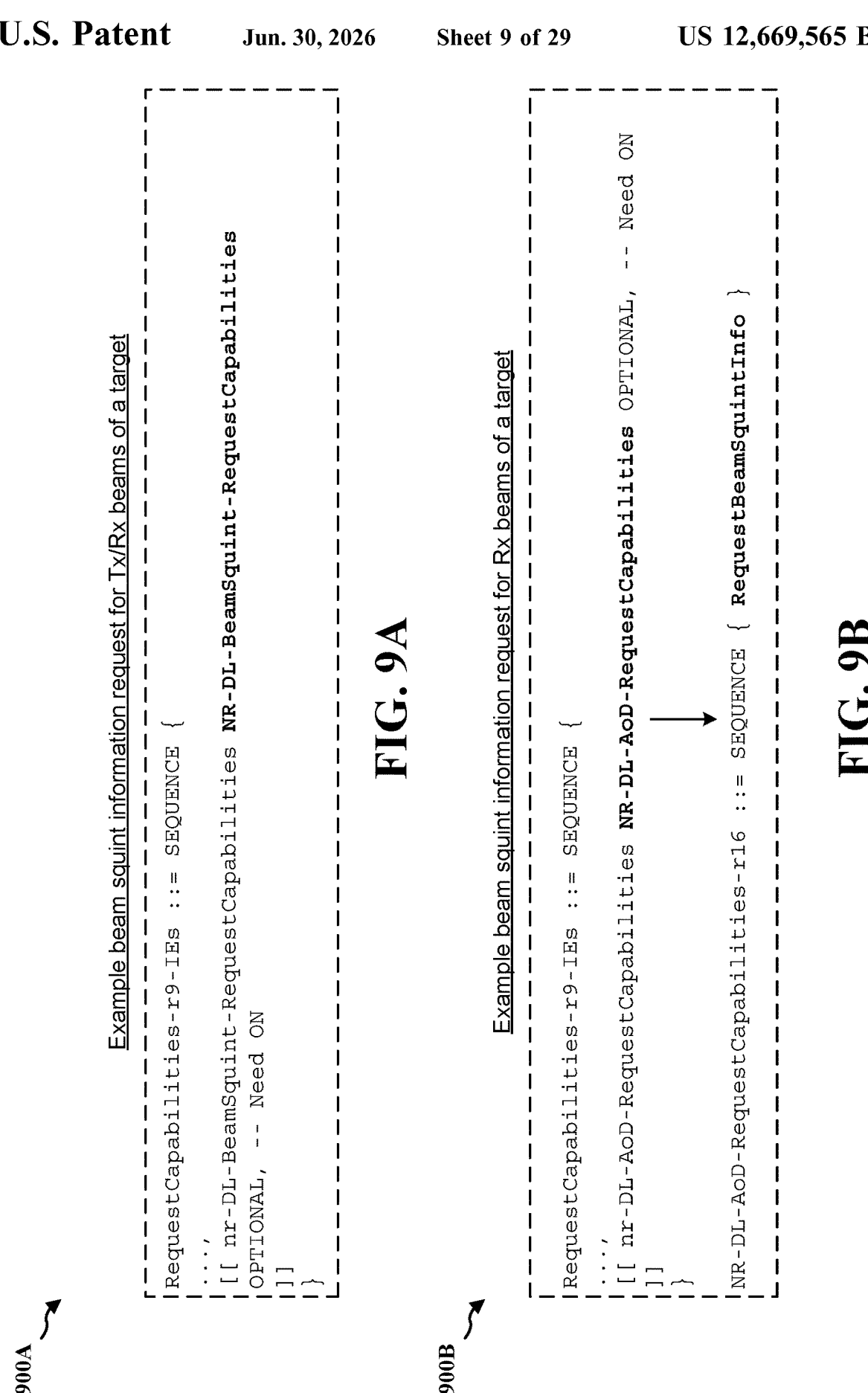

Example beam squint information request for Tx/Rx beams of a target

```
RequestCapabilities-r9-IEs ::= SEQUENCE {
...,
[[ nr-DL-BeamSquint-RequestCapabilities NR-DL-BeamSquint-RequestCapabilities
OPTIONAL, -- Need ON
]]
}
```

Example beam squint information request for Rx beams of a target

```
RequestCapabilities-r9-IEs ::= SEQUENCE {
...,
[[ nr-DL-AoD-RequestCapabilities NR-DL-AoD-RequestCapabilities OPTIONAL, -- Need ON
]]
}

NR-DL-AoD-RequestCapabilities-r16 ::= SEQUENCE { RequestBeamSquintInfo }
```

Example beam squint information reporting for Tx/Rx beams of a target

```
ProvideCapabilities-r9-IEs ::= SEQUENCE {
...,
[[ nr-DL-BeamSquint-ProvideCapabilities  NR-DL-BeamSquint-ProvideCapabilities
OPTIONAL, -- Need ON
]]
...,
}
```

FIG. 10A

Example beam squint information reporting for Rx beams of a target

```
ProvideCapabilities-r9-IEs ::= SEQUENCE {
...,
[[ nr-DL-AoD-ProvideCapabilities  NR-DL-AoD-ProvideCapabilities OPTIONAL,  -- Need ON
]]
...,
}

NR-DL-AoD-ProvideCapabilities ::= SEQUENCE {
nr-DL-AoD-Mode-r16 PositioningModes,
nr-DL-BeamSquint-PRS-Capability NR-DL-PRS-BeamSquint,
...,
}
```

FIG. 10B

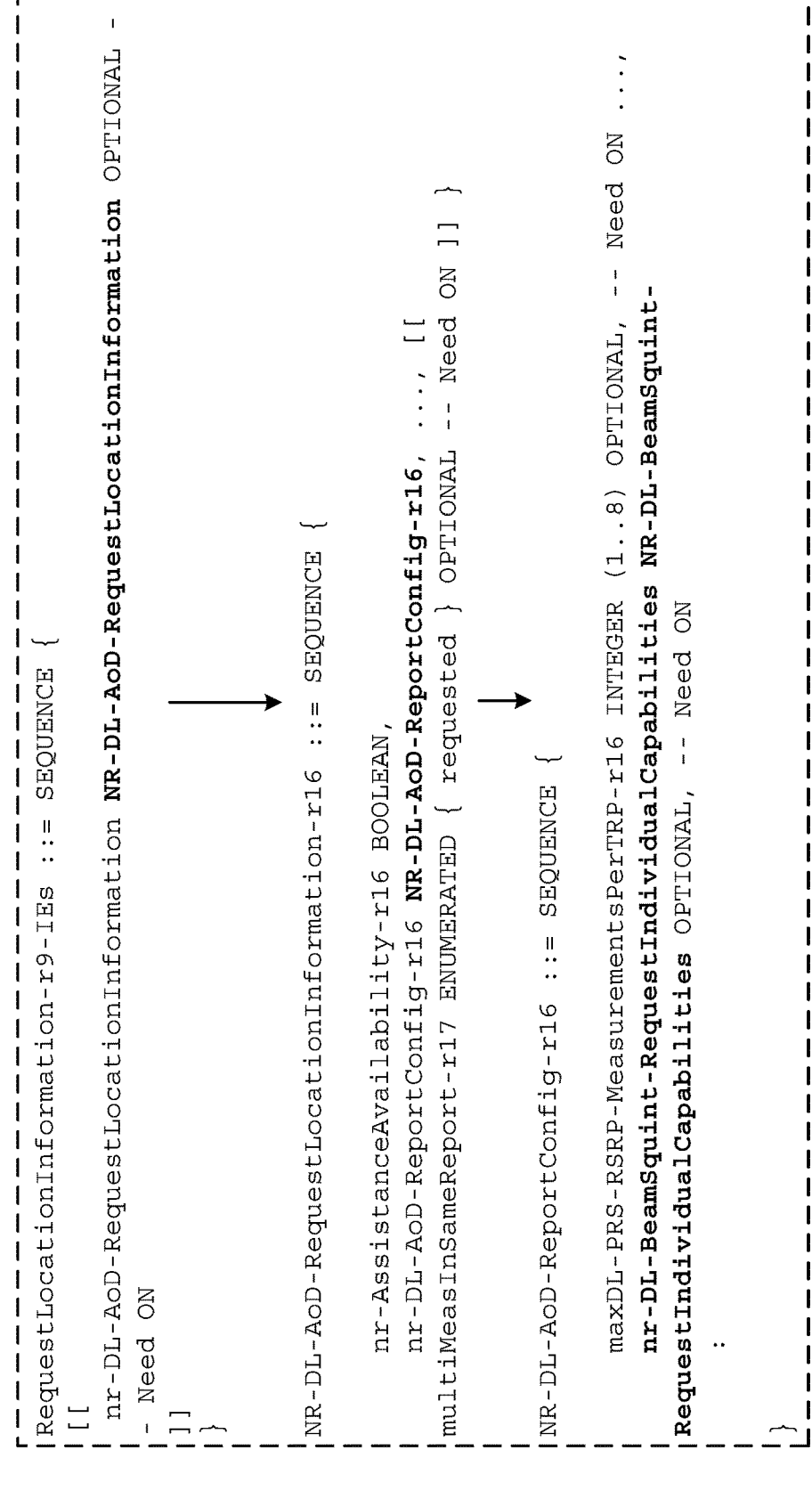

Example beam squint information request for an individual beam of a target

```
RequestLocationInformation-r9-IEs ::= SEQUENCE {
[[
    nr-DL-AoD-RequestLocationInformation NR-DL-AoD-RequestLocationInformation OPTIONAL -
- Need ON
]]
}

NR-DL-AoD-RequestLocationInformation-r16 ::= SEQUENCE {
    nr-AssistanceAvailability-r16 BOOLEAN,
    nr-DL-AoD-ReportConfig-r16 NR-DL-AoD-ReportConfig-r16, ..., [[
    multiMeasInSameReport-r17 ENUMERATED { requested } OPTIONAL -- Need ON ]] }

NR-DL-AoD-ReportConfig-r16 ::= SEQUENCE {
    maxDL-PRS-RSRP-MeasurementsPerTRP-r16 INTEGER (1..8) OPTIONAL, -- Need ON ...,
    nr-DL-BeamSquint-RequestIndividualCapabilities NR-DL-BeamSquint-
RequestIndividualCapabilities OPTIONAL, -- Need ON
    :
}
```

Example beam squint information report/provide for an individual beam of a target

```
ProvideLocationInformation-r9-IEs ::= SEQUENCE {
[[
nr-DL-AoD-ProvideLocationInformation NR-DL-AoD-ProvideLocationInformation OPTIONAL
]]
}

NR-DL-AoD-ProvideLocationInformation-r16 ::= SEQUENCE {
        nr-DL-AoD-SignalMeasurementInformation-r16 NR-DL-AoD-SignalMeasurementInformation-
r16 OPTIONAL,
        nr-dl-AoD-LocationInformation-r16 NR-DL-AoD-LocationInformation-r16 OPTIONAL, nr-DL-
AoD-Error-r16 NR-DL-AoD-Error-r16 OPTIONAL
        ',...',
        [[
            nr-DL-AoD-SignalMeasurementInstances-r17 SEQUENCE (SIZE (1..maxMeasInstances-
r17)) OF NR-DL-AoD-SignalMeasurementInformation- r16 OPTIONAL, -- Cond batchUEA nr-DL-
AoD-LocationInformationInstances-r17 SEQUENCE (SIZE (1..maxMeasInstances-r17)) OF NR-DL-
AoD-LocationInformation-r16 OPTIONAL -- Cond batchUEB
        ]]
        ..
}

NR-DL-AoD-LocationInformation-r16 ::= SEQUENCE {
    measurementReferenceTime-r16 CHOICE {
        sfn-time-r16 NR-TimeStamp-r16,
        utc-time-r16 UTCTime,
        ...
    }
    individualBeamSquintInfo IndividualBeamSquintInfo
```

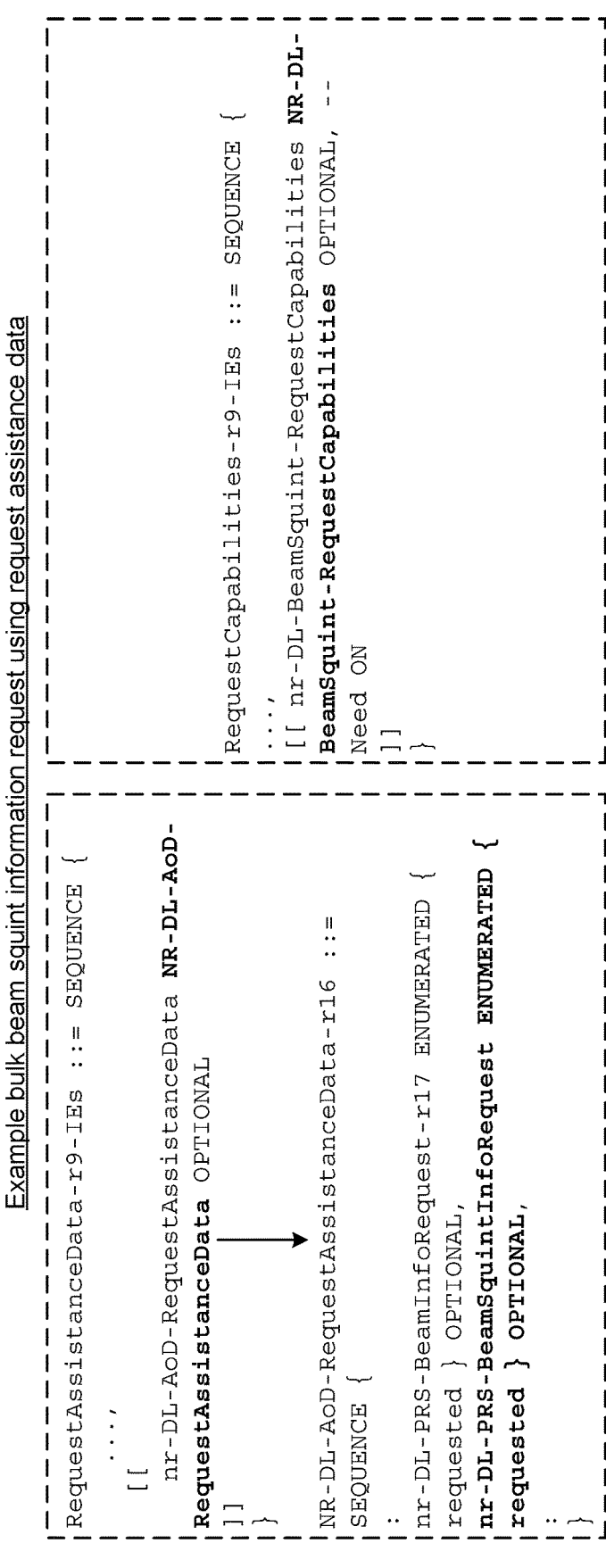

Example bulk beam squint information request using request assistance data

```
RequestAssistanceData-r9-IEs ::= SEQUENCE {
    ...,
    [[
        nr-DL-AoD-RequestAssistanceData NR-DL-AoD-
RequestAssistanceData OPTIONAL
    ]]
}

NR-DL-AoD-RequestAssistanceData-r16 ::=
SEQUENCE {
    ...
    nr-DL-PRS-BeamInfoRequest-r17 ENUMERATED {
requested } OPTIONAL,
    nr-DL-PRS-BeamSquintInfoRequest ENUMERATED {
requested } OPTIONAL,
    ... }
```

```
RequestCapabilities-r9-IEs ::= SEQUENCE {
    ...,
    [[ nr-DL-BeamSquint-RequestCapabilities NR-DL-
BeamSquint-RequestCapabilities OPTIONAL, --
Need ON
    ]]
}
```

Example NRPPa TRP Information Exchange Procedure

1700B

Example NRPPa Position Information Exchange Procedure

1700C

Example NRPPa Measurement Information Exchange Procedure

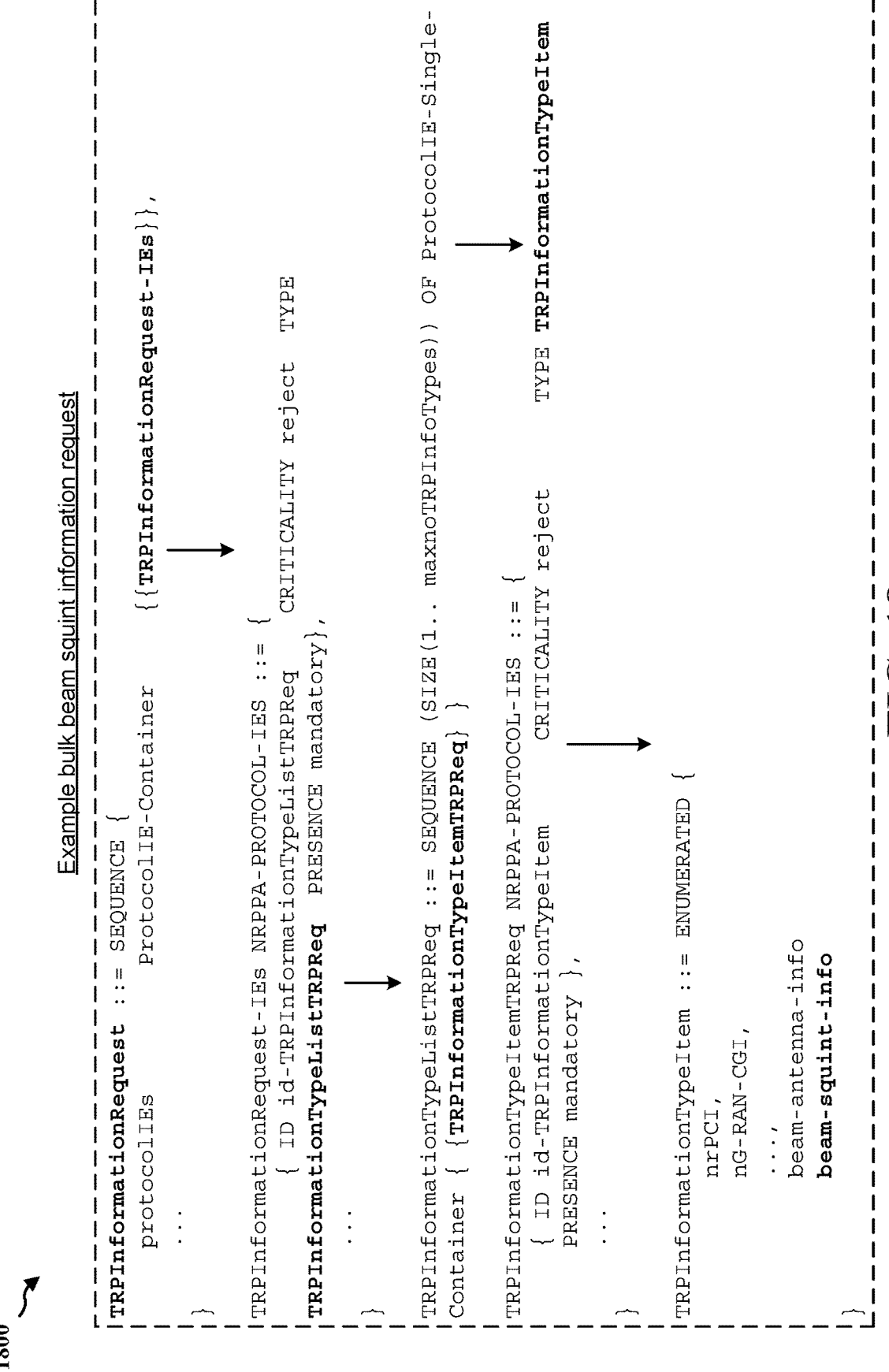

Example bulk beam squint information request

```
TRPInformationRequest ::= SEQUENCE {
    protocolIEs          ProtocolIE-Container          {{TRPInformationRequest-IEs}},
    ...
}

TRPInformationRequest-IEs NRPPA-PROTOCOL-IES ::= {
    { ID id-TRPInformationTypeListTRPReq    CRITICALITY reject    TYPE
TRPInformationTypeListTRPReq    PRESENCE mandatory},
    ...
}

TRPInformationTypeListTRPReq ::= SEQUENCE (SIZE(1.. maxnoTRPInfoTypes)) OF ProtocolIE-Single-
Container { {TRPInformationTypeItemTRPReq} }

TRPInformationTypeItemTRPReq NRPPA-PROTOCOL-IES ::= {
    { ID id-TRPInformationTypeItem    CRITICALITY reject    TYPE TRPInformationTypeItem
PRESENCE mandatory },
    ...
}

TRPInformationTypeItem ::= ENUMERATED {
    nrPCI,
    nG-RAN-CGI,
    ...,
    beam-antenna-info
    beam-squint-info
}
```

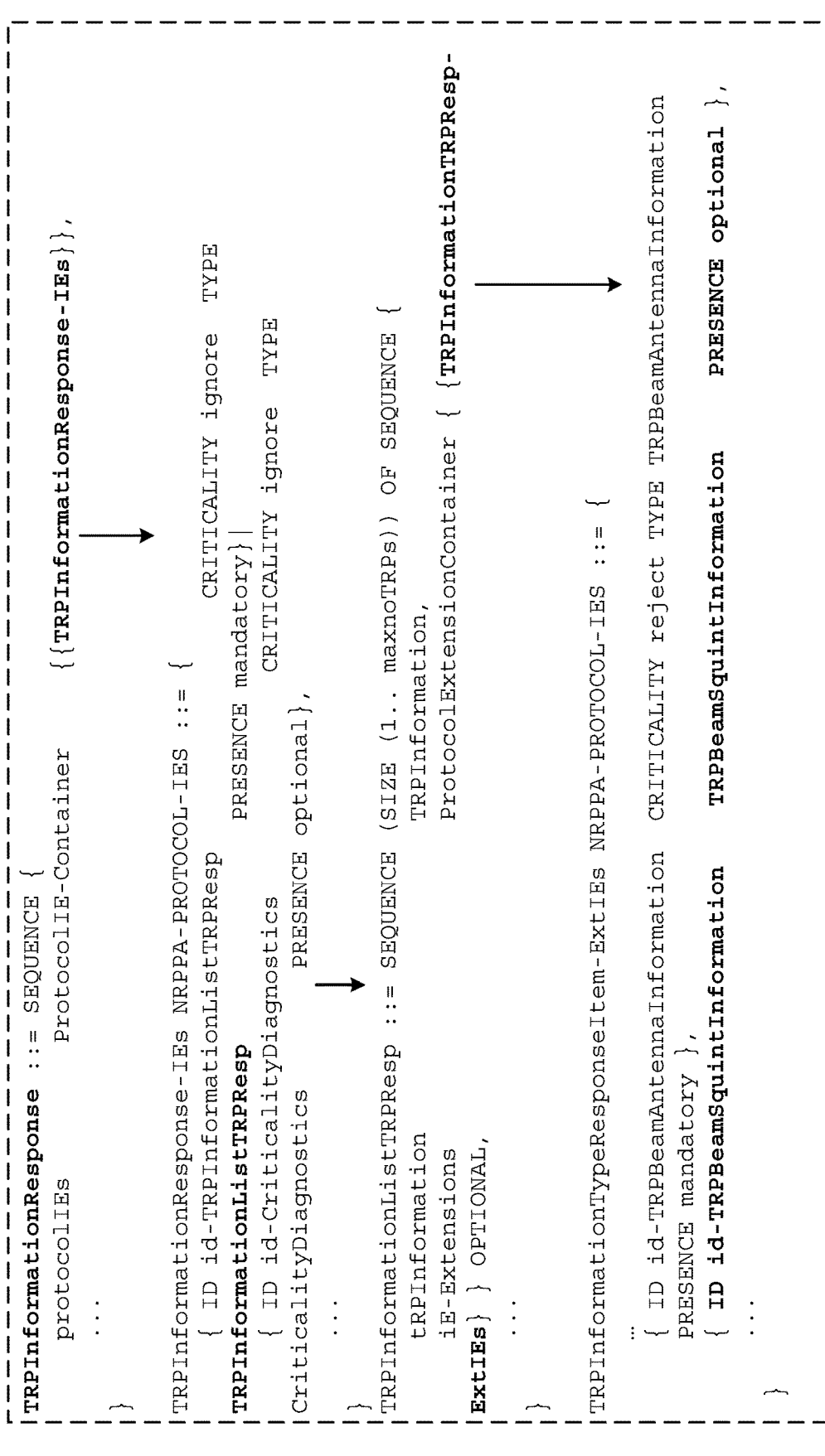

Example bulk beam squint information response

```
TRPInformationResponse ::= SEQUENCE {
    protocolIEs    ProtocolIE-Container    {{TRPInformationResponse-IEs}},
    ...
}

TRPInformationResponse-IEs NRPPA-PROTOCOL-IES ::= {
    { ID id-TRPInformationListTRPResp    CRITICALITY ignore    TYPE
TRPInformationListTRPResp    PRESENCE mandatory}|
    { ID id-CriticalityDiagnostics    CRITICALITY ignore    TYPE
CriticalityDiagnostics    PRESENCE optional},
    ...
}

TRPInformationListTRPResp ::= SEQUENCE (SIZE (1.. maxnoTRPs)) OF SEQUENCE {
    tRPInformation    TRPInformation,
    iE-Extensions    ProtocolExtensionContainer { {TRPInformationTRPResp-
ExtIEs} } OPTIONAL,
    ...
}

TRPInformationTypeResponseItem-ExtIEs NRPPA-PROTOCOL-IES ::= {
    ...
    { ID id-TRPBeamAntennaInformation    CRITICALITY reject    TYPE TRPBeamAntennaInformation
PRESENCE mandatory },
    { ID id-TRPBeamSquintInformation    TRPBeamSquintInformation    PRESENCE optional },
    ...
}
```

Example bulk beam squint information using assistance information

```
AssistanceInformationControl-IEs NRPPA-PROTOCOL-IES ::= {
    { ID id-Assistance-Information      CRITICALITY reject    TYPE Assistance-Information
PRESENCE optional}|
    { ID id-Broadcast          CRITICALITY reject    TYPE Broadcast
PRESENCE optional}|
    { ID id-PositioningBroadcastCells              CRITICALITY reject    TYPE
PositioningBroadcastCells                      PRESENCE optional},
    ...
}

Assistance-Information ::= SEQUENCE {
    systemInformation          SystemInformation,
    iE-Extensions          ProtocolExtensionContainer { { Assistance-
Information-ExtIEs} } OPTIONAL,
    nr-UL-TX-BeamSquint-ProvideAssistanceInfo NR-UL-TX-BeamSquint-ProvideAssistanceInfo
OPTIONAL
    ...
}
```

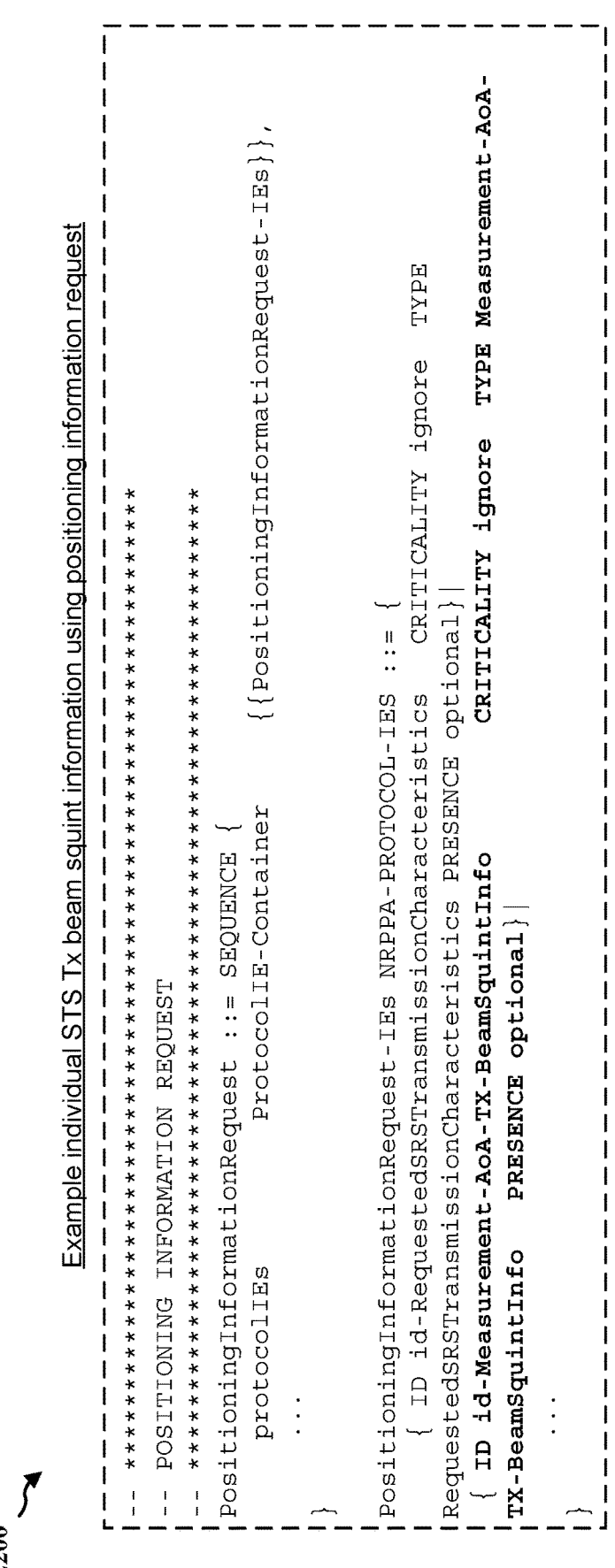

2200

```
Example individual STS Tx beam squint information using positioning information request -- ********************************************************************
-- POSITIONING INFORMATION REQUEST
-- ********************************************************************
PositioningInformationRequest ::= SEQUENCE {
        protocolIEs        ProtocolIE-Container        {{PositioningInformationRequest-IEs}},
    ...
}

PositioningInformationRequest-IEs NRPPA-PROTOCOL-IES ::= {
    { ID id-RequestedSRSTransmissionCharacteristics    CRITICALITY ignore    TYPE
RequestedSRSTransmissionCharacteristics PRESENCE optional}|
    { ID id-Measurement-AoA-Tx-BeamSquintInfo        CRITICALITY ignore    TYPE    Measurement-AoA-
Tx-BeamSquintInfo    PRESENCE optional}|
    ...
}
```

FIG. 22

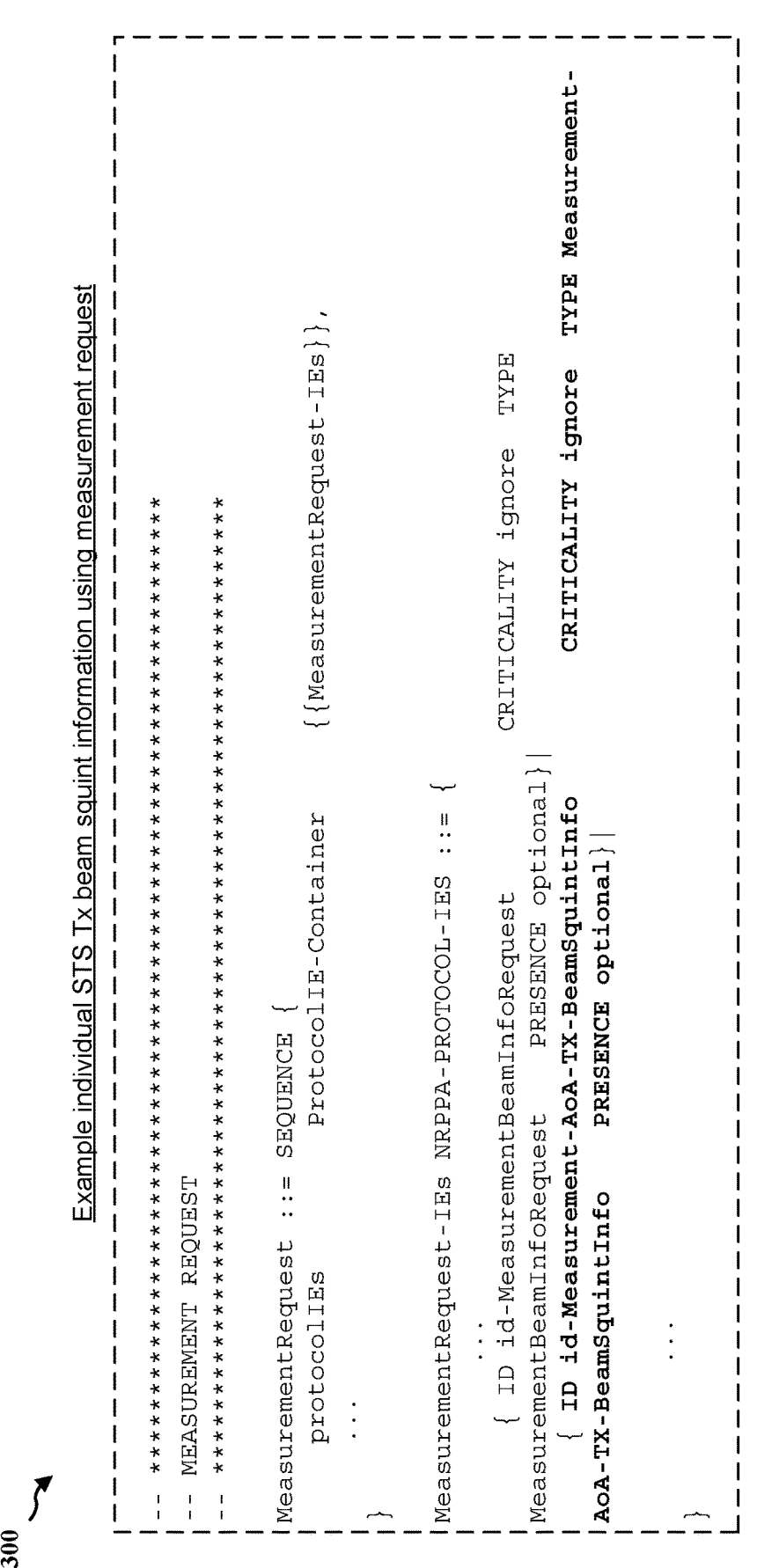

Example individual STS Tx beam squint information using measurement request

```
-- ********************************************************
-- MEASUREMENT REQUEST
-- ********************************************************

MeasurementRequest ::= SEQUENCE {
    protocolIEs         ProtocolIE-Container    {{MeasurementRequest-IEs}},
    ...
}

MeasurementRequest-IEs NRPPA-PROTOCOL-IES ::= {
    ...
    { ID id-MeasurementBeamInfoRequest      CRITICALITY ignore    TYPE
MeasurementBeamInfoRequest      PRESENCE optional}|
    { ID id-Measurement-AoA-TX-BeamSquintInfo      CRITICALITY ignore    TYPE Measurement-
AoA-TX-BeamSquintInfo      PRESENCE optional}|
    ...
}
```

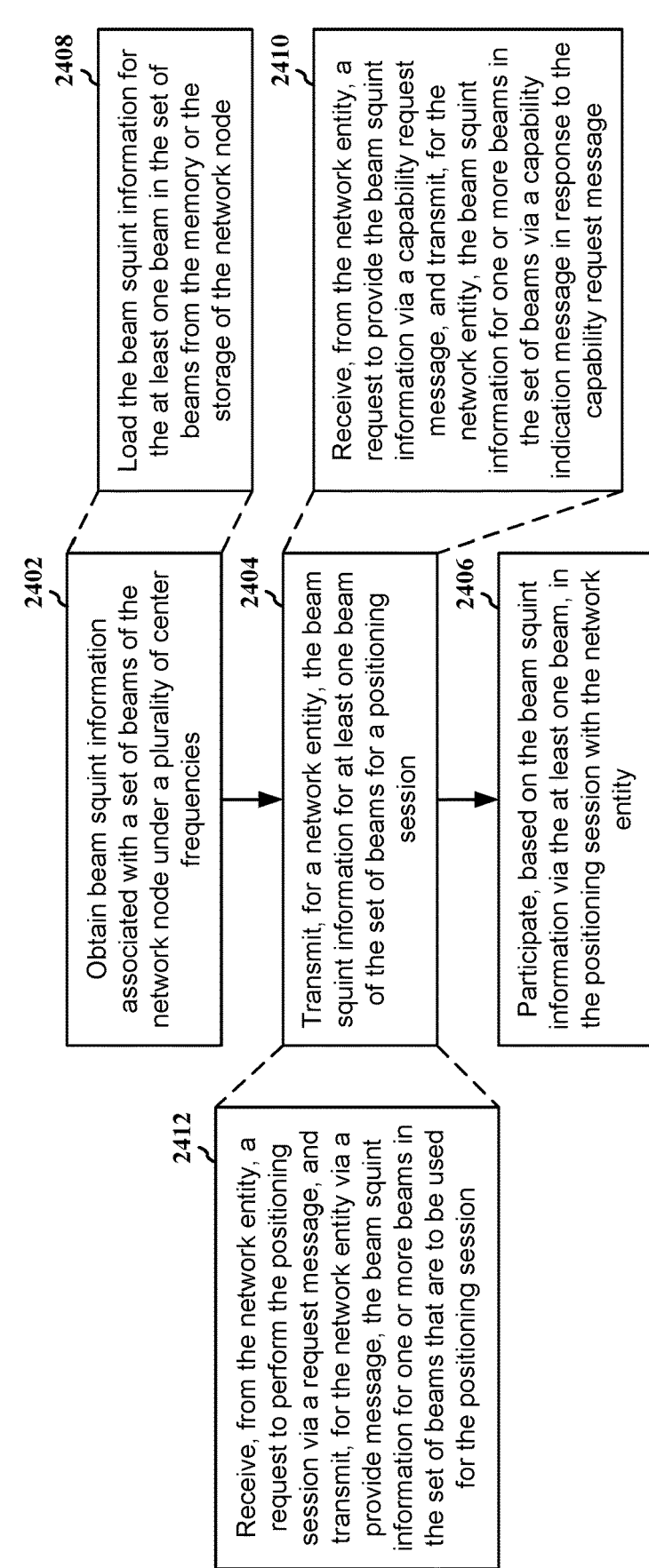

2402 Obtain beam squint information associated with a set of beams of the network node under a plurality of center frequencies 2408 Load the beam squint information for the at least one beam in the set of beams from the memory or the storage of the network node 2404 Transmit, for a network entity, the beam squint information for at least one beam of the set of beams for a positioning session 2410 Receive, from the network entity, a request to provide the beam squint information via a capability request message, and transmit, for the network entity, the beam squint information for one or more beams in the set of beams via a capability indication message in response to the capability request message 2406 Participate, based on the beam squint information via the at least one beam, in the positioning session with the network entity 2412 Receive, from the network entity, a request to perform the positioning session via a request message, and transmit, for the network entity via a provide message, the beam squint information for one or more beams in the set of beams that are to be used for the positioning session

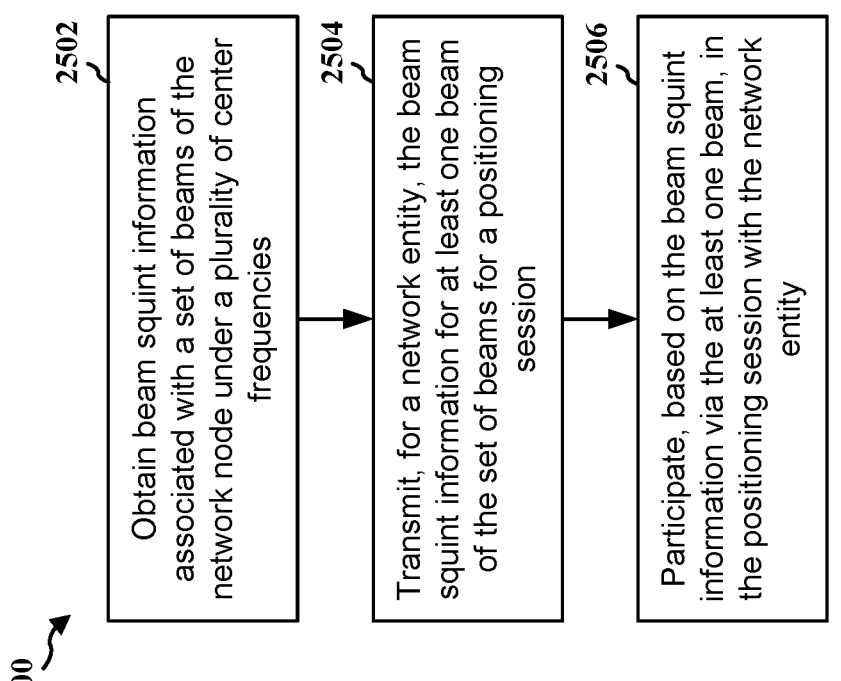

2500

2502

Obtain beam squint information associated with a set of beams of the network node under a plurality of center frequencies

2504

Transmit, for a network entity, the beam squint information for at least one beam of the set of beams for a positioning session

2506

Participate, based on the beam squint information via the at least one beam, in the positioning session with the network entity

FIG. 25

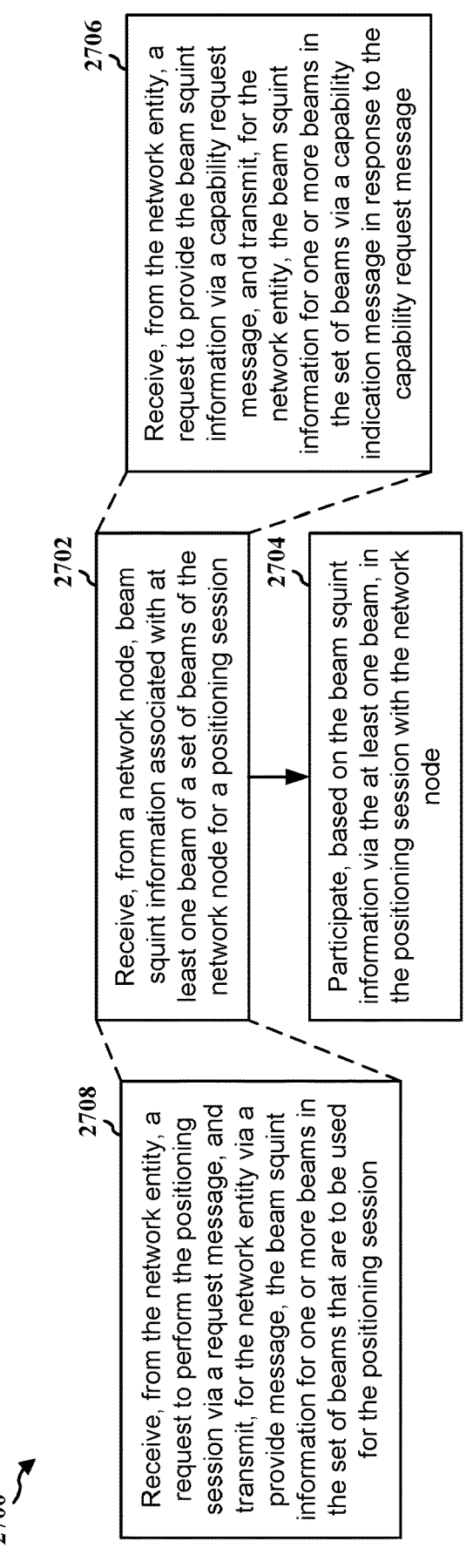

2706

Receive, from the network entity, a request to provide the beam squint information via a capability request message, and transmit, for the network entity, the beam squint information for one or more beams in the set of beams via a capability indication message in response to the capability request message

2702

Receive, from a network node, beam squint information associated with at least one beam of a set of beams of the network node for a positioning session

2704

Participate, based on the beam squint information via the at least one beam, in the positioning session with the network node

2708

Receive, from the network entity, a request to perform the positioning session via a request message, and transmit, for the network entity via a provide message, the beam squint information for one or more beams in the set of beams that are to be used for the positioning session

Receive, from a network node, beam squint information associated with at least one beam of a set of beams of the network node for a positioning session

2804

Participate, based on the beam squint information via the at least one beam, in the positioning session with the network node

BEAM SQUINT PROFILING, INDICATION, AND REPORTING FOR POSITIONING AND SENSING

TECHNICAL FIELD

The present disclosure relates generally to communication systems, and more particularly, to a wireless communication involving positioning and sensing.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus obtains beam squint information associated with a set of beams of the network node under a plurality of center frequencies. The apparatus transmits, for a network entity, the beam squint information for at least one beam of the set of beams for a positioning session. The apparatus participates, based on the beam squint information via the at least one beam, in the positioning session with the network entity.

In an aspect of the disclosure, a method, a computer-readable medium, and an apparatus are provided. The apparatus receives, from a network node, beam squint information associated with at least one beam of a set of beams of the network node for a positioning session. The apparatus participates, based on the beam squint information via the at least one beam, in the positioning session with the network node.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 9A is a diagram illustrating an example beam squint information messaging in accordance with various aspects of the present disclosure.

FIG. 9B is a diagram illustrating an example beam squint information messaging in accordance with various aspects of the present disclosure.

FIG. 10A is a diagram illustrating an example beam squint information messaging in accordance with various aspects of the present disclosure.

FIG. 10B is a diagram illustrating an example beam squint information messaging in accordance with various aspects of the present disclosure.

FIG. 11 is a diagram illustrating an example beam squint information messaging in accordance with various aspects of the present disclosure.

FIG. 12 is a diagram illustrating an example beam squint information messaging in accordance with various aspects of the present disclosure.

FIG. 14 is a diagram illustrating an example beam squint information messaging in accordance with various aspects of the present disclosure.

FIG. 18 is a diagram illustrating an example beam squint information messaging in accordance with various aspects of the present disclosure.

FIG. 19 is a diagram illustrating an example beam squint information messaging in accordance with various aspects of the present disclosure.

FIG. 21 is a diagram illustrating an example beam squint information messaging in accordance with various aspects of the present disclosure.

FIG. 22 is a diagram illustrating an example beam squint information messaging in accordance with various aspects of the present disclosure.

FIG. 23 is a diagram illustrating an example beam squint information messaging in accordance with various aspects of the present disclosure.

FIG. 24 is a flowchart of a method of wireless communication.

FIG. 25 is a flowchart of a method of wireless communication.

FIG. 27 is a flowchart of a method of wireless communication.

DETAILED DESCRIPTION

Figure 1:
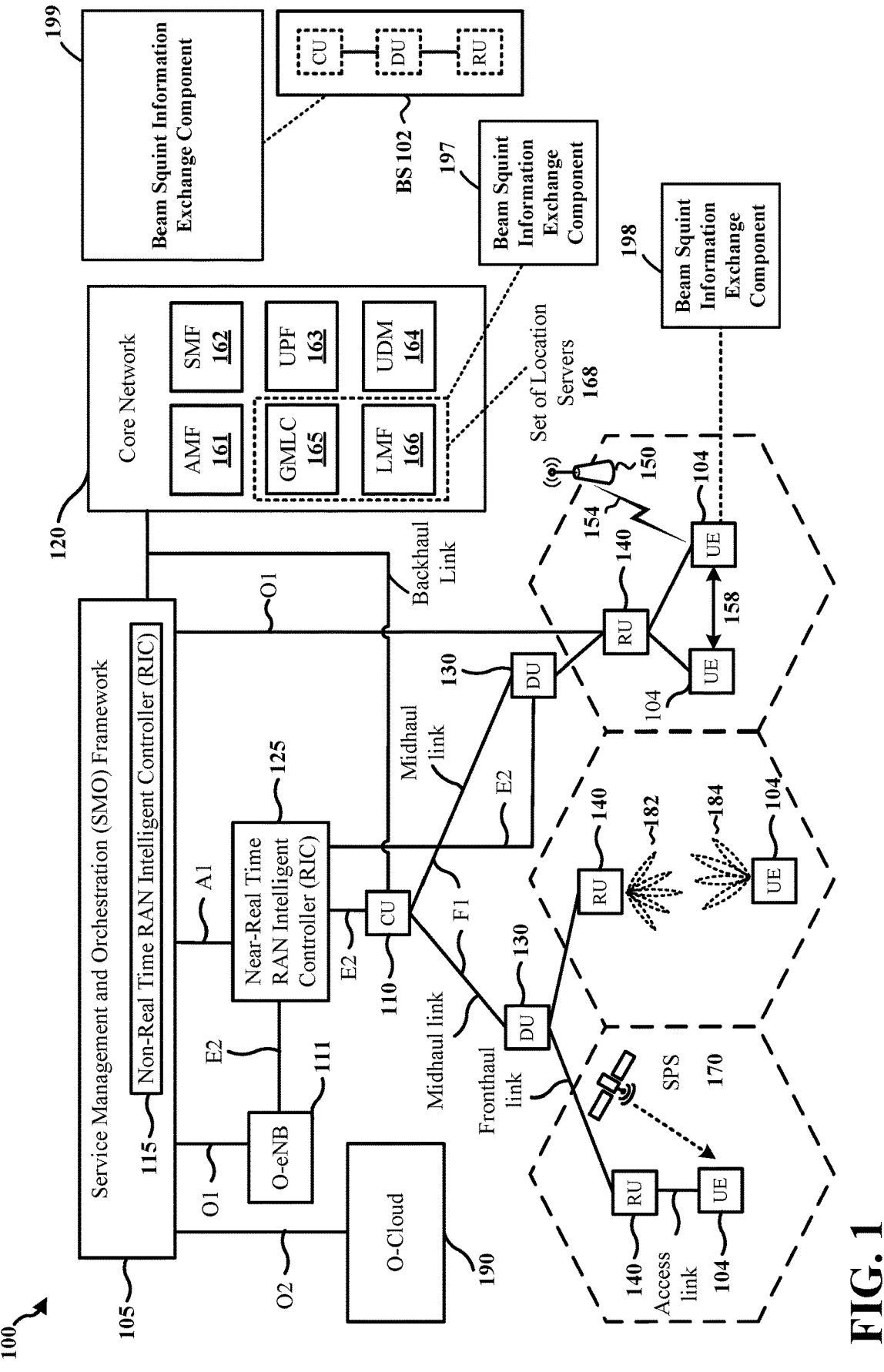
FIG. 1 is a diagram illustrating an example of a wireless communications system and an access network.

Aspects presented herein may improve the accuracy and reliability of user equipment (UE) positioning when the UE positioning is based on communication links that are operating over a wideband channel where beam squinting is likely to occur. Aspects presented herein may enable network entities and nodes (e.g., base station, location server, transmission-reception point (TRP), UE, etc.) to take beam squinting information into consideration when performing positioning for a UE, such as performing angle-of-arrival (AoA)/angle-of-departure (AoD)-based positioning and sensing for the UE. In one aspect of the present disclosure, a UE and/or a TRP may be configured/specified to report its related beam squint information to a location server (e.g., a location management function (LMF)), where the beam squint information may be profiled based on a spherical measurement test. Aspects presented herein also provide example signaling for a UE and/or a TRP to provide its transmission (Tx)/reception (Rx) beam squint information to a location server, and also example signaling for a location server to provide Tx beam squint information to a receiver (e.g., for AoA/AoD-based positioning).

Particular aspects of the subject matter described in this disclosure can be implemented to realize one or more of the following potential advantages. For example, by enabling positioning entities (e.g., UE, TRPs/base station, and location server, etc.) to exchange their associated beam squint information, the positioning entities may evaluate the beam squint associated with the UE/TRP and correct angle measurement(s) for positioning and sensing applications if beam squint is expected, thereby improving the accuracy and reliability of the positioning.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FP-GAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EE-PROM), optical disk storage, magnetic disk storage, other magnetic storage devices, combinations of the types of computer-readable media, or any other medium that can be used to store computer executable code in the form of instructions or data structures that can be accessed by a computer. While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUS)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUS 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via 01) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHZ) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHZ), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHZ, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 and/or the base station 102 may include a beam squint information exchange component 198/199 that may be configured to obtain beam squint information associated with a set of beams of the network node under a plurality of center frequencies; transmit, for a network entity, the beam squint information for at least one beam of the set of beams for a positioning session; and participate, based on the beam squint information via the at least one beam, in the positioning session with the network entity.

In certain aspects, the one or more location servers 168 may have a beam squint information exchange component 197 that may be configured to receive, from a network node, beam squint information associated with at least one beam of a set of beams of the network node for a positioning session; and participate, based on the beam squint information via the at least one beam, in the positioning session with the network node.

Figures 2A, 2B, 2C, 2D:
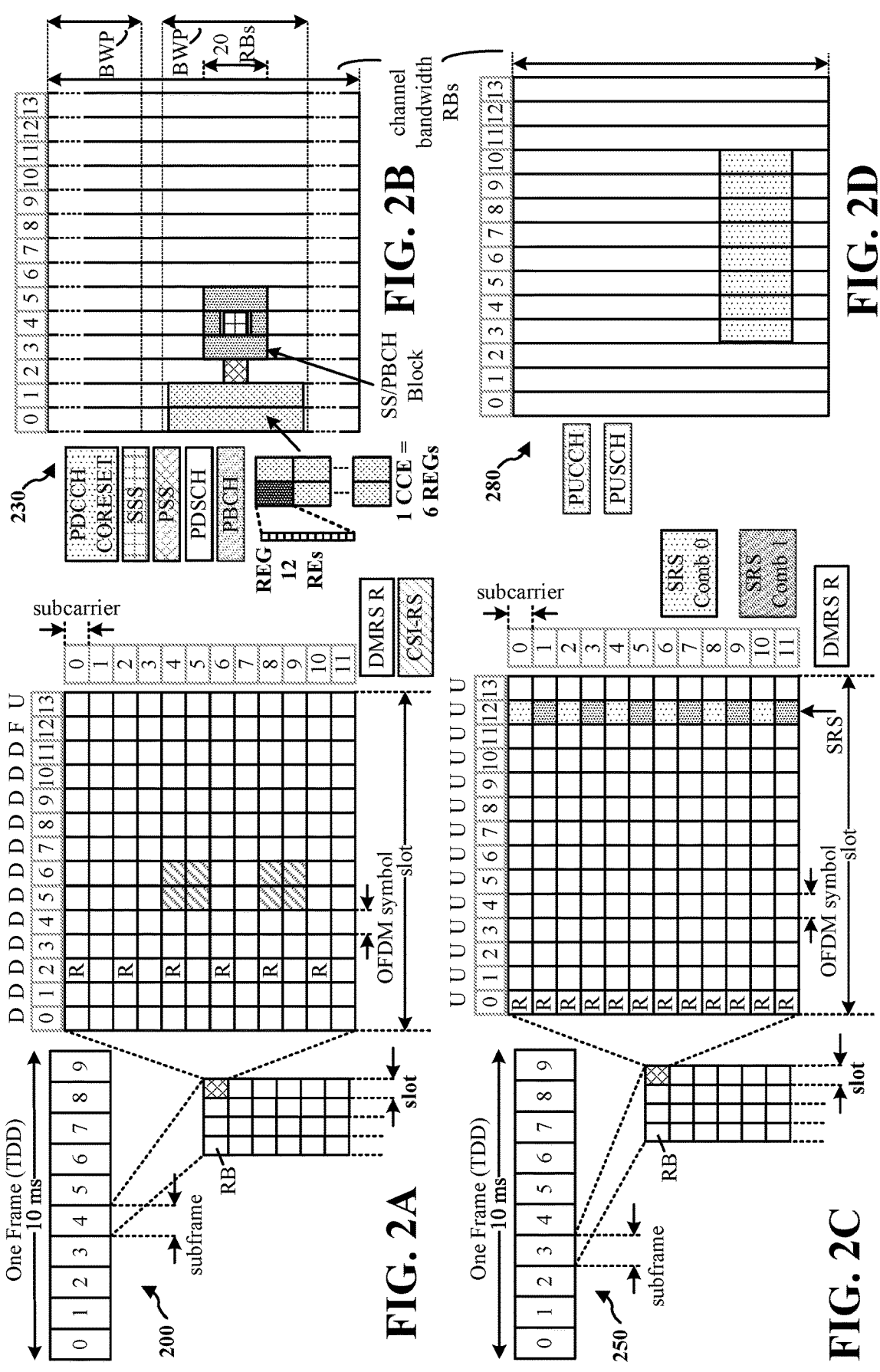
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

| Numerology, SCS, and CP | | |
|---|---|---|
| μ | SCS $\Delta f = 2^\mu \cdot 15[\text{kHz}]$ | Cyclic prefix |
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu * 15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
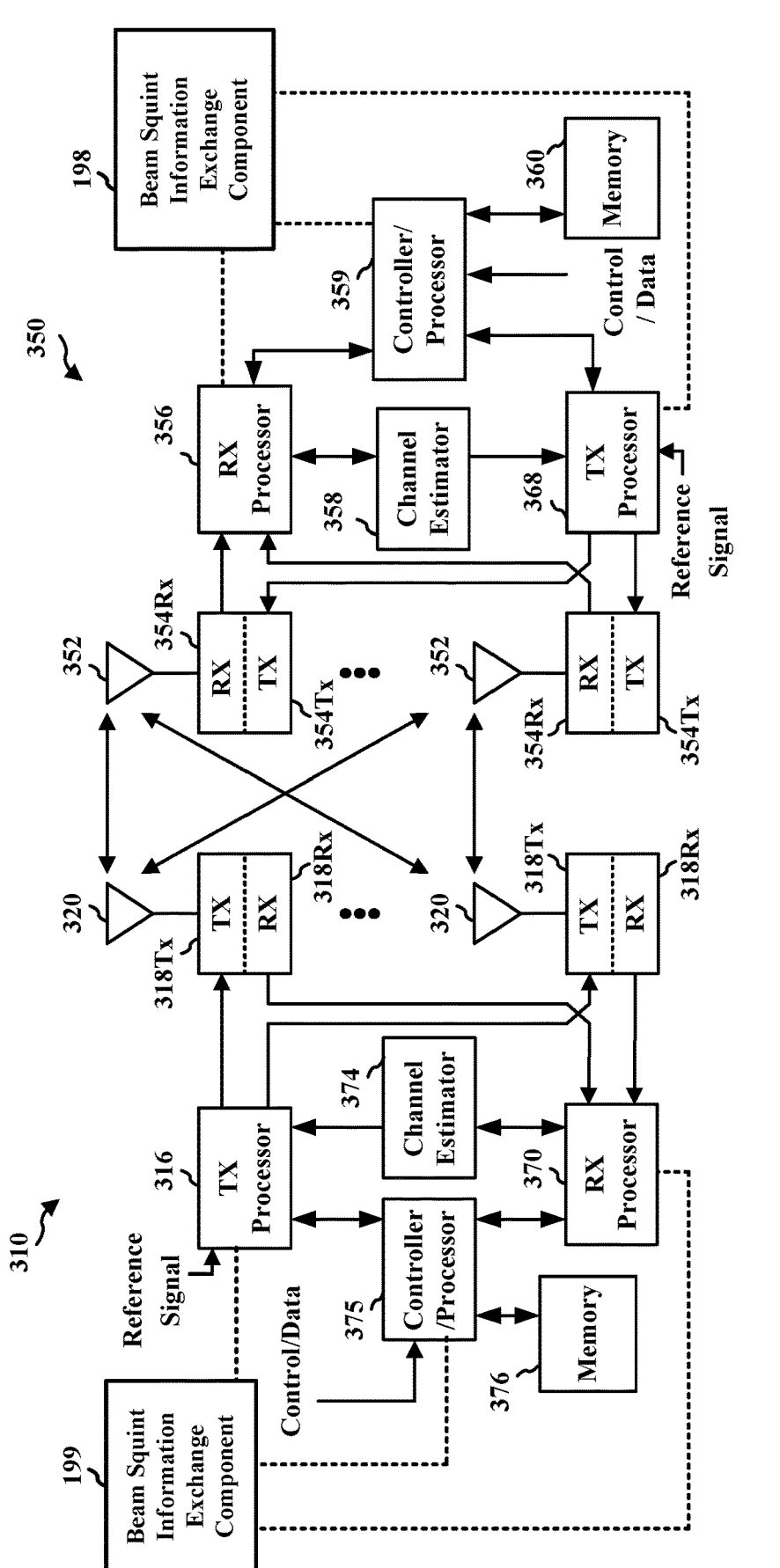
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency-domain, and then combined together using an Inverse Fast Fourier Transform (IFFT) to produce a physical channel carrying a time-domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency-domain using a Fast Fourier Transform (FFT). The frequency-domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the beam squint information exchange component 198 of FIG. 1.

At least one of the TX processor 316, the RX processor 370, and the controller/processor 375 may be configured to perform aspects in connection with the beam squint information exchange component 199 of FIG. 1.

Figure 4:
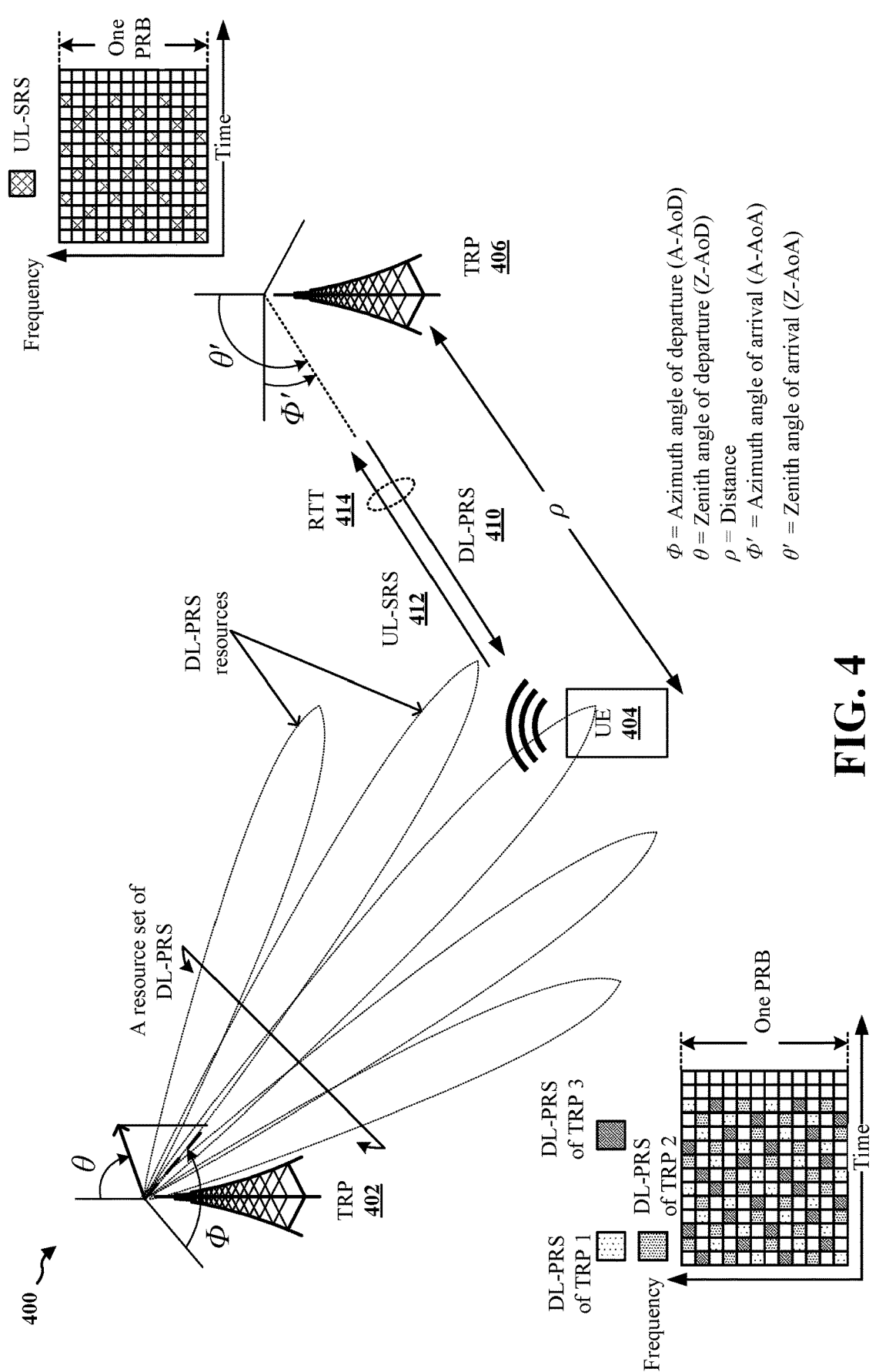
FIG. 4 is a diagram illustrating an example of a UE positioning based on reference signal measurements.

FIG. 4 is a diagram 400 illustrating an example of a UE positioning based on reference signal measurements (which may also be referred to as "network-based positioning") in accordance with various aspects of the present disclosure. The UE 404 may transmit UL-SRS 412 at time $T_{SRS\_TX}$ and receive DL positioning reference signals (PRS) (DL-PRS) 410 at time $T_{PRS\_RX}$. The TRP 406 may receive the UL-SRS 412 at time $T_{SRS\_RX}$ and transmit the DL-PRS 410 at time $T_{PRS\_TX}$. The UE 404 may receive the DL-PRS 410 before transmitting the UL-SRS 412, or may transmit the UL-SRS 412 before receiving the DL-PRS 410. In both cases, a positioning server (e.g., location server(s) 168) or the UE 404 may determine the RTT 414 based on $\|T_{SRS\_RX} - T_{PRS\_TX}\| - \|T_{SRS\_TX} - T_{PRS\_RX}\|$. Accordingly, multi-RTT positioning may make use of the UE Rx-Tx time difference measurements (i.e., $\|T_{SRS\_TX} - T_{PRS\_RX}\|$) and DL-PRS reference signal received power (RSRP) (DL-PRS-RSRP) of downlink signals received from multiple TRPs 402, 406 and measured by the UE 404, and the measured TRP Rx-Tx time difference measurements (i.e., $\|T_{SRS\_RX} - T_{PRS\_TX}\|$) and UL-SRS-RSRP at multiple TRPs 402, 406 of uplink signals transmitted from UE 404. The UE 404 measures the UE Rx-Tx time difference measurements (and optionally DL-PRS-RSRP of the received signals) using assistance data received from the positioning server, and the TRPs 402, 406 measure the gNB Rx-Tx time difference measurements (and optionally UL-SRS-RSRP of the received signals) using assistance data received from the positioning server. The measurements may be used at the positioning server or the UE 404 to determine the RTT, which is used to estimate the location of the UE 404. Other methods are possible for determining the RTT, such as for example using DL-TDOA and/or UL-TDOA measurements.

PRSs may be defined for network-based positioning (e.g., NR positioning) to enable UEs to detect and measure more neighbor transmission and reception points (TRPs), where multiple configurations are supported to enable a variety of deployments (e.g., indoor, outdoor, sub-6, mmW, etc.). To support PRS beam operation, beam sweeping may also be configured for PRS. The UL positioning reference signal may be based on sounding reference signals (SRSs) with enhancements/adjustments for positioning purposes. In some examples, UL-PRS may be referred to as "SRS for positioning," and a new Information Element (IE) may be configured for SRS for positioning in RRC signaling.

DL PRS-RSRP may be defined as the linear average over the power contributions (in [W]) of the resource elements of the antenna port(s) that carry DL PRS reference signals configured for RSRP measurements within the considered measurement frequency bandwidth. In some examples, for FR1, the reference point for the DL PRS-RSRP may be the antenna connector of the UE. For FR2, DL PRS-RSRP may be measured based on the combined signal from antenna elements corresponding to a given receiver branch. For FR1 and FR2, if receiver diversity is in use by the UE, the reported DL PRS-RSRP value may not be lower than the corresponding DL PRS-RSRP of any of the individual receiver branches. Similarly, UL SRS-RSRP may be defined as linear average of the power contributions (in [W]) of the resource elements carrying sounding reference signals (SRS). UL SRS-RSRP may be measured over the configured resource elements within the considered measurement frequency bandwidth in the configured measurement time occasions. In some examples, for FR1, the reference point for the UL SRS-RSRP may be the antenna connector of the base station (e.g., gNB). For FR2, UL SRS-RSRP may be measured based on the combined signal from antenna elements corresponding to a given receiver branch. For FR1 and FR2, if receiver diversity is in use by the base station, the reported UL SRS-RSRP value may not be lower than the corresponding UL SRS-RSRP of any of the individual receiver branches.

PRS-path RSRP (PRS-RSRPP) may be defined as the power of the linear average of the channel response at the i-th path delay of the resource elements that carry DL PRS signal configured for the measurement, where DL PRS-RSRPP for the 1st path delay is the power contribution corresponding to the first detected path in time. In some examples, PRS path Phase measurement may refer to the phase associated with an i-th path of the channel derived using a PRS resource.

DL-AoD positioning may make use of the measured DL-PRS-RSRP of downlink signals received from multiple TRPs 402, 406 at the UE 404. The UE 404 measures the DL-PRS-RSRP of the received signals using assistance data received from the positioning server, and the resulting measurements are used along with the azimuth angle of departure (A-AoD), the zenith angle of departure (Z-AoD), and other configuration information to locate the UE 404 in relation to the neighboring TRPs 402, 406.

DL-TDOA positioning may make use of the DL reference signal time difference (RSTD) (and optionally DL-PRS-RSRP) of downlink signals received from multiple TRPs 402, 406 at the UE 404. The UE 404 measures the DL RSTD (and optionally DL-PRS-RSRP) of the received signals using assistance data received from the positioning server, and the resulting measurements are used along with other configuration information to locate the UE 404 in relation to the neighboring TRPs 402, 406.

UL-TDOA positioning may make use of the UL relative time of arrival (RTOA) (and optionally UL-SRS-RSRP) at multiple TRPs 402, 406 of uplink signals transmitted from UE 404. The TRPs 402, 406 measure the UL-RTOA (and optionally UL-SRS-RSRP) of the received signals using assistance data received from the positioning server, and the resulting measurements are used along with other configuration information to estimate the location of the UE 404.

UL-AoA positioning may make use of the measured azimuth angle of arrival (A-AoA) and zenith angle of arrival (Z-AoA) at multiple TRPs 402, 406 of uplink signals transmitted from the UE 404. The TRPs 402, 406 measure the A-AoA and the Z-AoA of the received signals using assistance data received from the positioning server, and the resulting measurements are used along with other configuration information to estimate the location of the UE 404. For purposes of the present disclosure, a positioning operation in which measurements are provided by a UE to a base station/positioning entity/server to be used in the computation of the UE's position may be described as "UE-assisted," "UE-assisted positioning," and/or "UE-assisted position calculation," while a positioning operation in which a UE measures and computes its own position may be described as "UE-based," "UE-based positioning," and/or "UE-based position calculation."

Additional positioning methods may be used for estimating the location of the UE 404, such as for example, UE-side UL-AOD and/or DL-AoA. Note that data/measurements from various technologies may be combined in various ways to increase accuracy, to determine and/or to enhance certainty, to supplement/complement measurements, and/or to substitute/provide for missing information. For example, some UE positioning mechanisms may be radio access technology (RAT)-dependent (e.g., the positioning of a UE is based on a RAT), such as the downlink positioning (e.g., measuring of observed time difference of arrival (OTDOA), the uplink positioning (e.g., measuring of uplink time difference of arrival (UTDOA), and/or the combined DL and UL based positioning (e.g., measuring of RTT with respect to neighboring cells), etc. Some wireless communications systems may also support Enhanced Cell-ID (E-CID) positioning procedures that are based on radio resource management (RRM) measurements. On the other hand, some UE positioning mechanisms may be RAT-independent (e.g., the positioning of a UE does not rely on a RAT), such as the enhanced GNSS, and/or positioning technologies based on WLAN, Bluetooth, Terrestrial Beason System (TBS), and/or sensor based (e.g., barometric sensor, motion sensor), etc. Some UE positioning mechanisms may be based on a hybrid model, where multiple methods for positioning are used, which may include both RAT-dependent positioning technology and RAT-independent positioning technology (e.g., a GNSS with OTDOA hybrid positioning).

Note that the terms "positioning reference signal" and "PRS" generally refer to specific reference signals that are used for positioning in NR and LTE systems. However, as used herein, the terms "positioning reference signal" and "PRS" may also refer to any type of reference signal that can be used for positioning, such as but not limited to, PRS as defined in LTE and NR, TRS, PTRS, CRS, CSI-RS, DMRS, PSS, SSS, SSB, SRS, UL-PRS, etc. In addition, the terms "positioning reference signal" and "PRS" may refer to downlink or uplink positioning reference signals, unless otherwise indicated by the context. To further distinguish the type of PRS, a downlink positioning reference signal may be referred to as a "DL PRS," and an uplink positioning reference signal (e.g., an SRS-for-positioning, PTRS) may be referred to as an "UL-PRS." In addition, for signals that may be transmitted in both the uplink and downlink (e.g., DMRS, PTRS), the signals may be prepended with "UL" or "DL" to distinguish the direction. For example, "UL-DMRS" may be differentiated from "DL-DMRS."

As described in connection with FIG. 1, wireless devices may communicate with each other based on beamforming, where a transmitting device may steer/transmit its signal toward a specific direction (e.g., toward a receiving device). Thus, instead of sending the signal from a broadcast antenna to be spread in all directions, beamforming may use multiple antennas to send out and direct the same signal toward a single direction. Beamforming may result in a faster and a more reliable wireless data transfer. While a beamforming pattern (e.g., for a transmission (Tx) and/or a reception (Rx) beam) may be optimized on a specific direction for a particular frequency, deviating from this optimized frequency may create squinting to the resultant beam. This may be referred to as beam squint or beam squinting, where the beam direction may vary or drift when the operating frequency changes.

Figure 5:
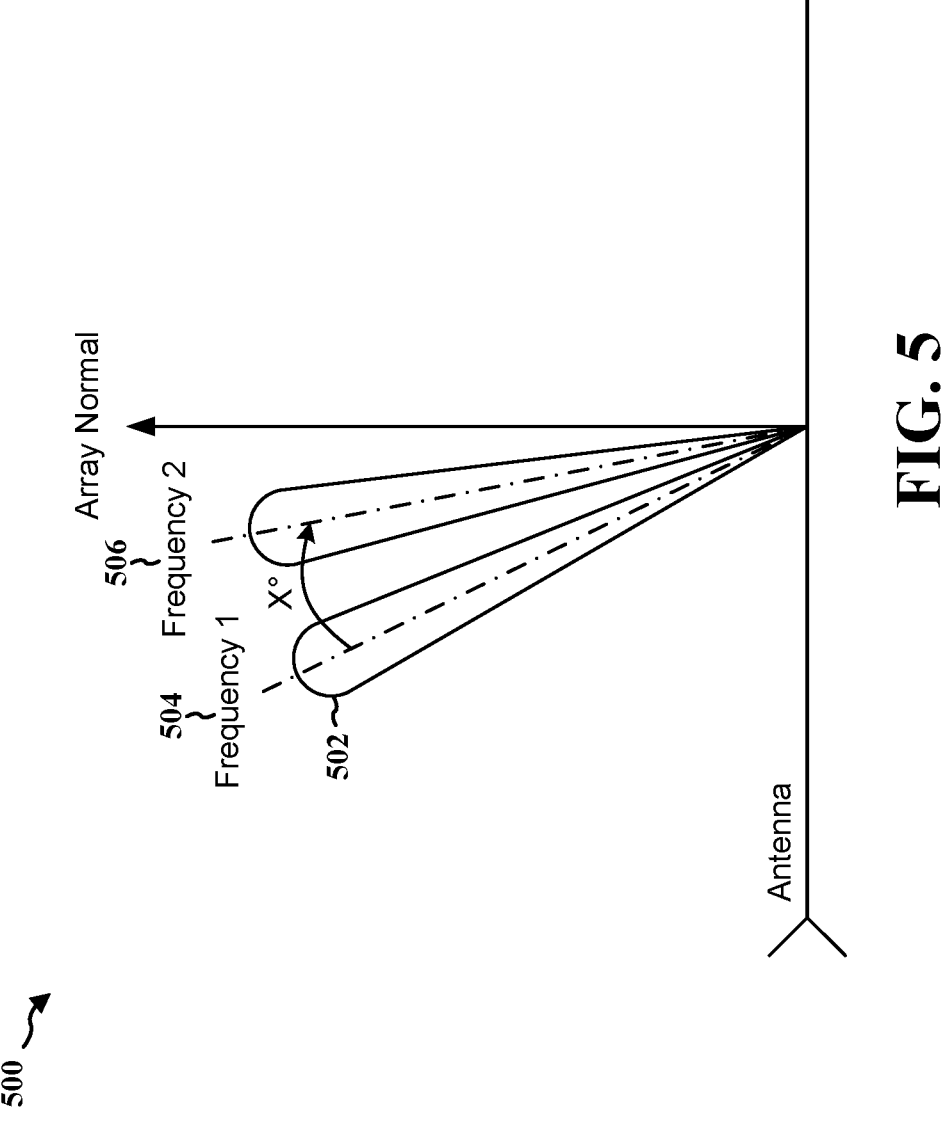
FIG. 5 is a diagram illustrating an example beam squint in accordance with various aspects of the present disclosure.

FIG. 5 is a diagram 500 illustrating an example beam squint in accordance with various aspects of the present disclosure. As shown at 504, based on beamforming, a Tx beam 502 may be configured to transmit toward a first direction under a first Tx frequency (Frequency 1). However, as shown at 506, if the Tx frequency changes (e.g., increases or decreases to a second Tx frequency (Frequency 2)), the direction of the Tx beam 502 may also change, such as shift by X degrees (X°). In some examples, for a phased array or slotted waveguide antenna, beam squint may refer to an angle that the transmission is offset from the normal of the plane of the antenna. Thus, beam squint may also refer to a change in the beam direction as a function of operating frequency, polarization, or orientation.

Beam squint may become more tangible (and common) when communication links are operating over a wideband channel but are relying on beams that are optimized on a subset of this wideband. This may result in various levels of performance degradation depending on the level of squint. For example, once the Tx frequency is changed, the direction of a Tx beam may not be pointing toward a preferred/expected direction.

In general, a UE (and for certain transmission reception points (TRPs) to some extent) may have antenna arrays that may be optimized for a limited number of center frequencies. However, given the plethora of frequency bands available nowadays (e.g., FR2 and beyond), a UE and/or a TRP may be more likely to operate on various center frequencies and/or operate on a portion of a wideband channel (e.g., on a sub-band (SB) of the wideband channel). Thus, beam squinting may be expected to be an impairment that the UE and/or the TRP is to account for.

In some scenarios, beam squint may impact the accuracy and reliability of UE positioning. For example, for network-based positioning described in connection with FIG. 4, beam squint may result in a transmitting device or a receiving device provide wrong or inaccurate beam angle information, which may affect the accuracy of computing angle-of-arrival (AoA)-based and/or angle-of-departure (AoD)-based positioning and sensing. For purposes of the present disclosure, AoD-based positioning and sensing, such as downlink (DL)-AoD positioning, may refer to a positioning method that makes use of the measured DL-positioning reference signal (PRS)-reference signal received power (RSRP) (DL-PRS-RSRP) and DL-PRS-reference signal received path power (DL-PRS-RSRPP) of DL signals received from multiple TPs, at a UE. The UE may measure the DL-PRS-RSRP and the DL-PRS-RSRPP of the received signals using assistance data received from a positioning server (e.g., an LMF), and the resulting measurements may be used by the positioning server and/or the UE along with other configuration information to locate the UE in relation to the neighboring transmission points (TPs). On the other hand, AoA-based positioning and sensing, such as uplink (UL)-AoA positioning, may refer to a positioning method that makes use of the measured azimuth angle of arrival (A-AoA) and zenith angle of arrival (Z-AoA) at multiple reception points (RPs) of uplink signals transmitted from a UE. The RPs may measure A-AoA and Z-AoA (and optionally UL-SRS-RSRPP) of the received signals using assistance data received from a positioning server (e.g., an LMF), and the resulting measurements may be used by the positioning server and/or the UE along with other configuration information to estimate the location of the UE.

Aspects presented herein may improve the accuracy and reliability of UE positioning when the UE positioning is based on communication links that are operating over a wideband channel where beam squinting is likely to occur. Aspects presented herein may enable network entities and nodes (e.g., base station, location server, TRP, UE, etc.) to take beam squinting information into consideration when performing positioning for a UE, such as performing AoA/AoD-based positioning and sensing for the UE. In one aspect of the present disclosure, a UE and/or a TRP may be configured/specified to report its related beam squint information to a location server (e.g., a location management function (LMF)), which may assist the location server (and other network entities/nodes) to evaluate the beam squint associated with the UE/TRP and correct angle measurement(s) for positioning and sensing applications if beam squint is expected. Aspects presented herein may enable beam squint information to be profiled using spherical measurement test. Aspects presented herein also provide example signaling for a UE and/or a TRP to provide its Tx/Rx beam squint information to a location server, and also example signaling for a location server to provide Tx beam squint information to a receiver (e.g., for AoA/AOD-based positioning).

Figure 6:
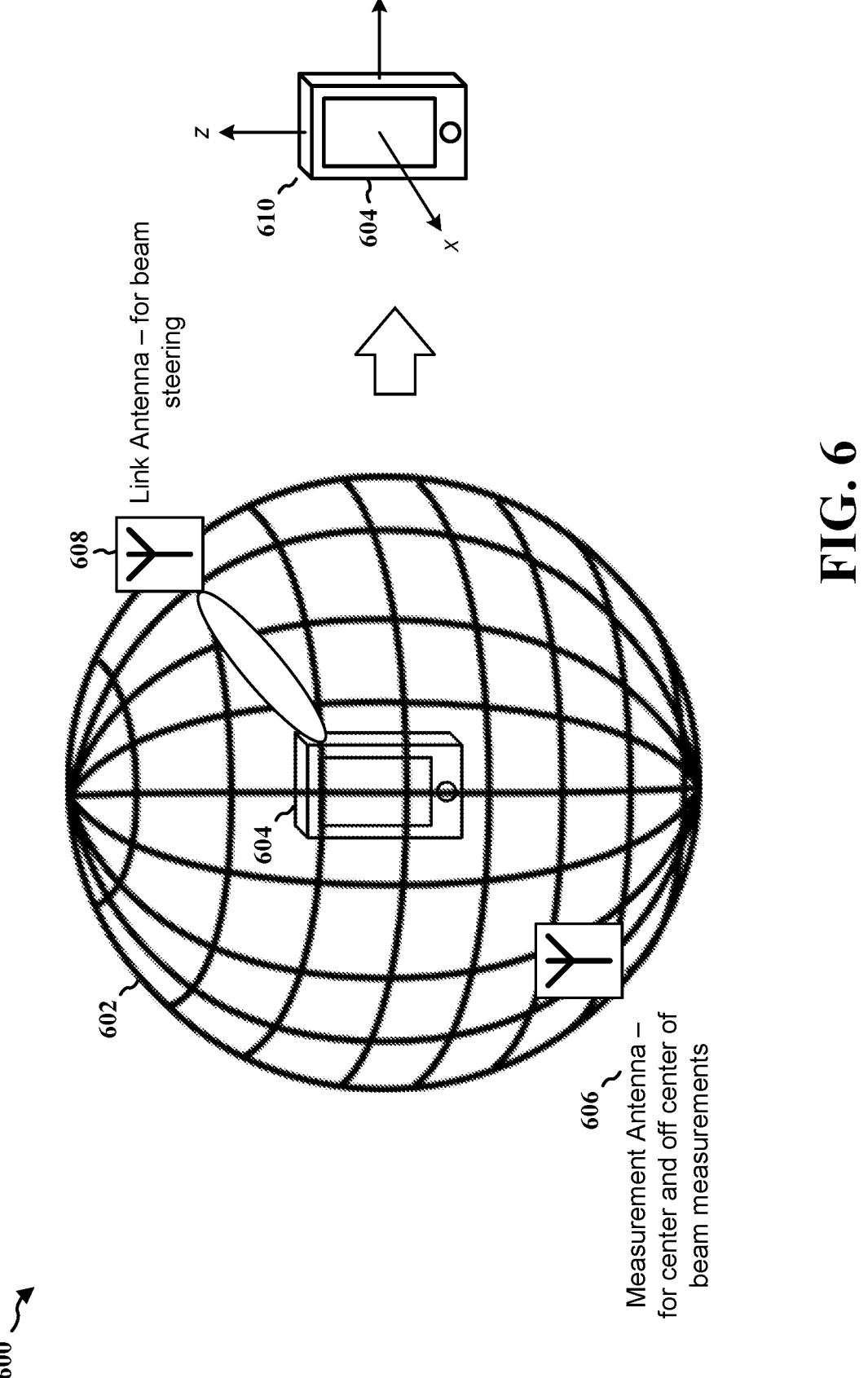
FIG. 6 is a diagram illustrating an example of measuring radio frequency (RF) characteristics of a UE based on a spherical measurement test in accordance with various aspects of the present disclosure.

In one aspect of the present disclosure, the beam squint characteristic/information associated with a wireless device (e.g., a UE, a TRP, etc.) may be measured/determined based on using a spherical measurement test. FIG. 6 is a diagram 600 illustrating an example of measuring radio frequency (RF) characteristics of a UE based on a spherical measurement test in accordance with various aspects of the present disclosure. As shown at 602, a direct far field (DFF) measurement may be setup for a UE 604 that measures the RF characteristics of the UE 604 from different angles, where a goal is to ensure composite beam pattern over all beams of the UE 604 to be as wide as possible. A DFF measurement may refer to an over-the-air (OTA) test method used in wireless communications (e.g., 5G NR) that involves mounting the UE 604 (which may also be referred to as a device under test (DUT)) on a positioner that rotates in azimuth and elevation directions. This process may enable measurement of the UE 604 at any angle on a three-dimensional (3D) sphere (hence the name spherical measurement). In some examples, the far-field of the UE 604 may also be measured in an anechoic chamber. As shown at 606, the DFF/spherical measurement may specify a first positioning system where the angle between the dual-polarized measurement antenna and the UE 604 has at least two axes of freedom and maintains a polarization reference, and as shown at 608, the DFF/spherical measurement may also specify a second positioning system such that the angle between the link antenna and the DUT has at least two axes of freedom and maintains a polarization reference. The second positioning system for the link antenna may be in addition to the first positioning system for the measurement antenna, where the second positioning system may provide for an angular relationship independently controllable from the measurement antenna. In one example, as shown at 610, to perform the spherical coverage test measurement for the UE 604, 45° beam steering granularity (e.g., from 45° to 135°) in the xz plane and 22.5° beam steering granularity (e.g., from −90° to 90°) in the xy plane may be configured for the test.

In some examples, two different types of measurement grid may be used for a spherical measurement: a planar uniform grid and a spherical uniform grid. Under the planar uniform grid, the measurement grid points may have the azimuth and elevation angles uniformly distributed with a constant step size. On the other hand, under the spherical uniform grid, the measurement grid points may be evenly distributed on the surface of the sphere with a constant density.

In one aspect of the present disclosure, the spherical measurement test described in connection with FIG. 6 may be used to characterize beam squint of a wireless device at different center frequencies, where the goal of the spherical measurement test is to determine an amount of beam squint for a given beam at a specified frequency raster, such as N different center frequencies $F=\{ f_1, \ldots, f_N\}$ . Then, the beam squint information associated with the wireless device may be stored as a lookup table (e.g., in the memory of the wireless device or on a server). For purposes of the present disclosure, a center frequency (e.g. of a filter or channel) may refer to a frequency between the upper and lower cutoff frequencies. For example, if a UE is configured to communicate with a frequency band between 26.5 to 29.5 GHZ, the center frequency for the communication may be 27 GHz.

Figure 7:
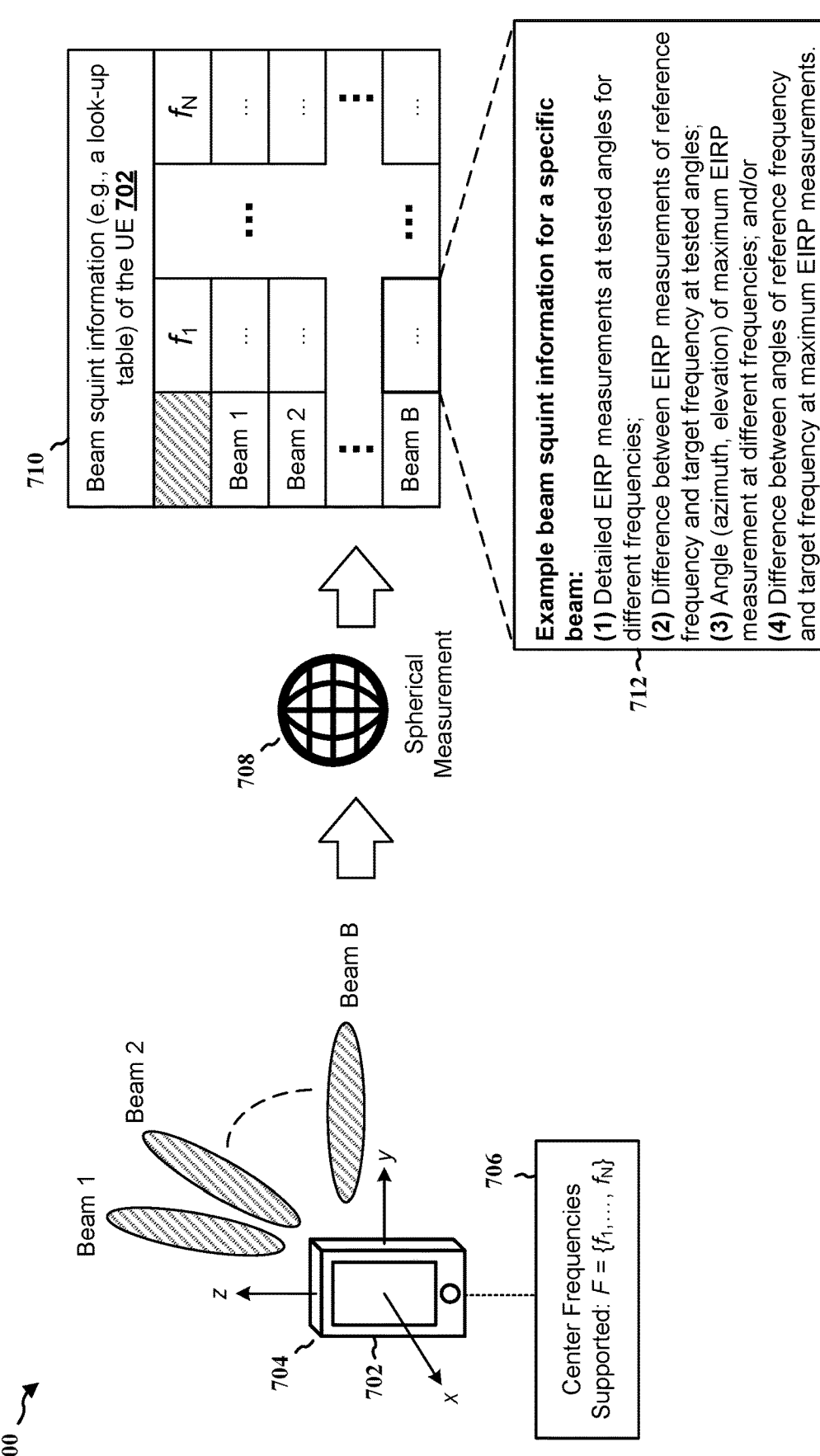
FIG. 7 is a diagram illustrating an example of obtaining beam squint information for a UE based on spherical measurements in accordance with various aspects of the present disclosure.

FIG. 7 is a diagram 700 illustrating an example of obtaining beam squint information for a UE based on spherical measurements in accordance with various aspects of the present disclosure. Note while FIG. 7 illustrates performing spherical measurements for a UE to obtain beam squint information of the UE, aspects presented herein may also apply to other wireless devices, such as a TRP, a hardware component capable of transmitting/receiving RF, and/or an RF sensing device, etc.

In one example, as shown at 704, a UE 702 may have the capability to beamform a set of beams (e.g., Tx beams and/or Rx beams), which may include a first beam (Beam 1), a second beam (Beam 2) and up to a $B^{th}$ beam (Beam B). In addition, as shown at 706, the UE 702 may also support (e.g., operate under) a set of center frequencies F, which may include a first center frequency ($f_1$), a second center frequency ($f_2$), and up to an $N^{th}$ center frequency ($f_N$).

As shown at 708, a spherical measurement may be set up for the UE 702 to measure beam squint information associated with one or more beams of the UE 702, where the measurement may be performed in a specified chamber or test location. In one example, for each beam j in the set of beams (e.g., beam 1 to beam B, a codebook, etc.), the UE 702 may be configured to form beam j at a center frequency $f_k$ (e.g., a codebook, setting of delay lines, etc.). Then, a spherical measurement test may be conducted for the UE 702 in a far filed region, where equivalent isotropic radiated powers (EIRPs) for beam j at center frequency $f_k$ may be recorded in (all) possible spherical directions. For example, $E_{j,f_k}$ may represent a set of EIRPs recorded for beam j at center frequency $f_k$, and $EIRP_{\phi,\theta_i}$ may represent EIRPs captured in all possible azimuth/elevation angles for beam j at frequency $f_k$ (e.g., $E_{j,f_k}=\{EIRP_{\phi,\theta}:\phi\in\Phi, \theta\in\Theta, f_k\}$. In some examples, granularity of measurements in terms of angular azimuth direction ($\delta\phi$) and elevation direction ($\delta\theta$) may be determined based on regulatory and/or standardization specifications. For example, based on some regulatory specifications, angular azimuth and elevation directions ($\delta\phi$, $\delta\theta$)

may be configured to be uniform or non-uniform. In addition, each EIRP measurement may be specified to be annotated with its corresponding azimuth direction $\phi_i$ and elevation direction $\theta_i$. This measurement process may continue for multiple or all beams in the set of beams B and/or for multiple or all center frequencies in the set of center frequencies F.

As shown at 710, based on the spherical measurement, a set of EIRP measurements (e.g., the beam squint information) for different combinations of beams and center frequencies may be obtained for the UE 702. In one example, beam squint information for a specific beam, such as beam j, may be characterized based on at least one of the following options.

As shown at 712, under a first option, beam squint information for a specific beam (e.g., beam j) may include detailed EIRP measurements at tested angles for different center frequencies, where $E_j=\{E_{j,f_1}, \ldots, E_{j,f_N}\}$ and $E_{j,f_k}=\{EIRP_{\phi,\theta}:\phi\in\Phi, \theta\in\Theta, f_k\}$. This option may specify higher storage/memory spaces for storing the beam squint information of the UE 702 and higher signaling overhead for transmitting the beam squint information of the UE 702.

Under a second option, beam squint information for a specific beam (e.g., beam j) may include difference between EIRP measurements of a reference frequency/reference center frequency (e.g., $f_1$) and a target frequency/target center frequency (e.g., $f_j$) at tested angles. For purposes of the present disclosure, a reference frequency or a reference center frequency may refer to a first frequency/center frequency that is associated with a set of EIRP measurements. On the other hand, a target frequency or a target center frequency may refer to a second frequency/center frequency (different from the first frequency/center frequency) where its EIRP measurements are represented based on the difference (e.g., delta) from the set of EIRP measurements associated with the first frequency/center frequency. For example, the EIRP measurements may be $\overline{\Delta E_j}=\{\Delta_{j,f_2}, \ldots, \Delta E_{j,f_N}\}$, where $\Delta E_{j,f_k}=E_{j,f_k}-E_{j,f_1}$, and $E_{j,f_k}=\{EIRP_{\phi,\theta}:\phi\in\Phi, \theta\in\Theta, f_k\}$. This option may reduce the amount of storage/memory spaces specified for storing the beam squint information of the UE 702 and also reduce the signaling overhead for transmitting the beam squint information of the UE 702.

Under a third option, beam squint information for a specific beam (e.g., beam j) may include angle (azimuth, elevation) of a maximum EIRP measurement at different frequencies, e.g., $(Az, El)_{j,f_k}=\{\phi^*_{j,f_k}, \theta^*_{j,f_k}\}$, where $\phi^*_{j,f_k}, \theta^*_{j,f_k}=argmax (E_{j,f_k})$. While this option may not include other EIRP measurements (e.g., non-maximum EIRP measurements), this option may further reduce storage/memory spaces and signaling overhead specified for storing or transmitting the beam squint information of the UE 702.

Under a fourth option, beam squint information for a specific beam (e.g., beam j) may include difference between angles of a reference frequency (e.g., $f_1$) and a target frequency (e.g., $f_j$) at maximum EIRP measurements, e.g., $(\Delta Az, \Delta El)_{j,f_k}=\{\Delta\phi^*_{j,f_k}, \Delta\theta^*_{j,f_k}\}$, where $\Delta\phi^*_{j,f_k}=\phi^*_{j,f_k}-\phi^*_{j,f_1}$, $\Delta\theta^*_{j,f_k}=\theta^*_{j,f_k}-\theta^*_{j,f_1}$, $\phi^*_{j,f_k}, \theta^*_{j,f_k}=argmax (E_{j,f_k})$, $\phi^*_{j,f_1}, \theta^*_{j,f_1}=argmax (E_{j,f_1})$. Similarly, this option may further reduce storage/memory spaces and signaling overhead specified for storing or transmitting the beam squint information of the UE 702.

In some examples, if the UE 702 supports a wide range of center frequencies, it may be impractical to measure the EIRP of a beam (or multiple beams) using all available center frequencies. Thus, beam squint information at some frequencies may be obtained/estimated by interpolation. For example, if beam squint information for a specific beam at center frequencies 26 GHz and 30 GHz is known, beam squint information for the specific beam at center frequencies between 26 GHz and 30 GHz (e.g., 27, 28, 29 GHz, etc.) may also be estimated or determined based on interpolation.

After the beam squint information of the UE 702 is obtained, the beam squint information may be stored in a memory/storage of the UE 702. In some examples, the beam squint information may be stored as a look-up table, such as shown at 710. In other examples, the beam squint information may be stored or available at a server (e.g., a cloud server) or at a network entity (e.g., a base station, a location server, an LMF, etc.). Then, if the UE 702 is specified to provide its beam squint information, the UE may load its beam squint information or the look-up table from the memory/storage, or retrieve it from the server.

In another aspect of the present disclosure, if beam squint information of a wireless device (e.g., a UE, a TRP, etc.) is available/known, the beam squint information of the wireless device may be shared among different network entities or nodes. For example, during a UE positioning session, the beam squint information of a UE and/or a TRP may be shared among one or more base stations and/or a location server (e.g., an LMF) (which may collectively be referred to as positioning entities). Then, based on the beam squint information of the UE/TRP, the location server may derive a more accurate measurement, such as AoA and AoD measurements, between a UE and a TRP, thereby improving the accuracy and reliability of the UE positioning.

In one example, a UE or a TRP (collectively as a "target" hereafter) may report its beam squint information to a location server (e.g., an LMF) based on using a capability transfer procedure and/or an LTE positioning protocol (LPP) location information transfer procedure. In addition, the target may be configured to report bulk beam squint information (e.g., beam squint information for multiple beams and/or center frequencies) or individual beam squint information (e.g., beam squint information for a specified beam and/or center frequency).

Figures 8A, 8B:
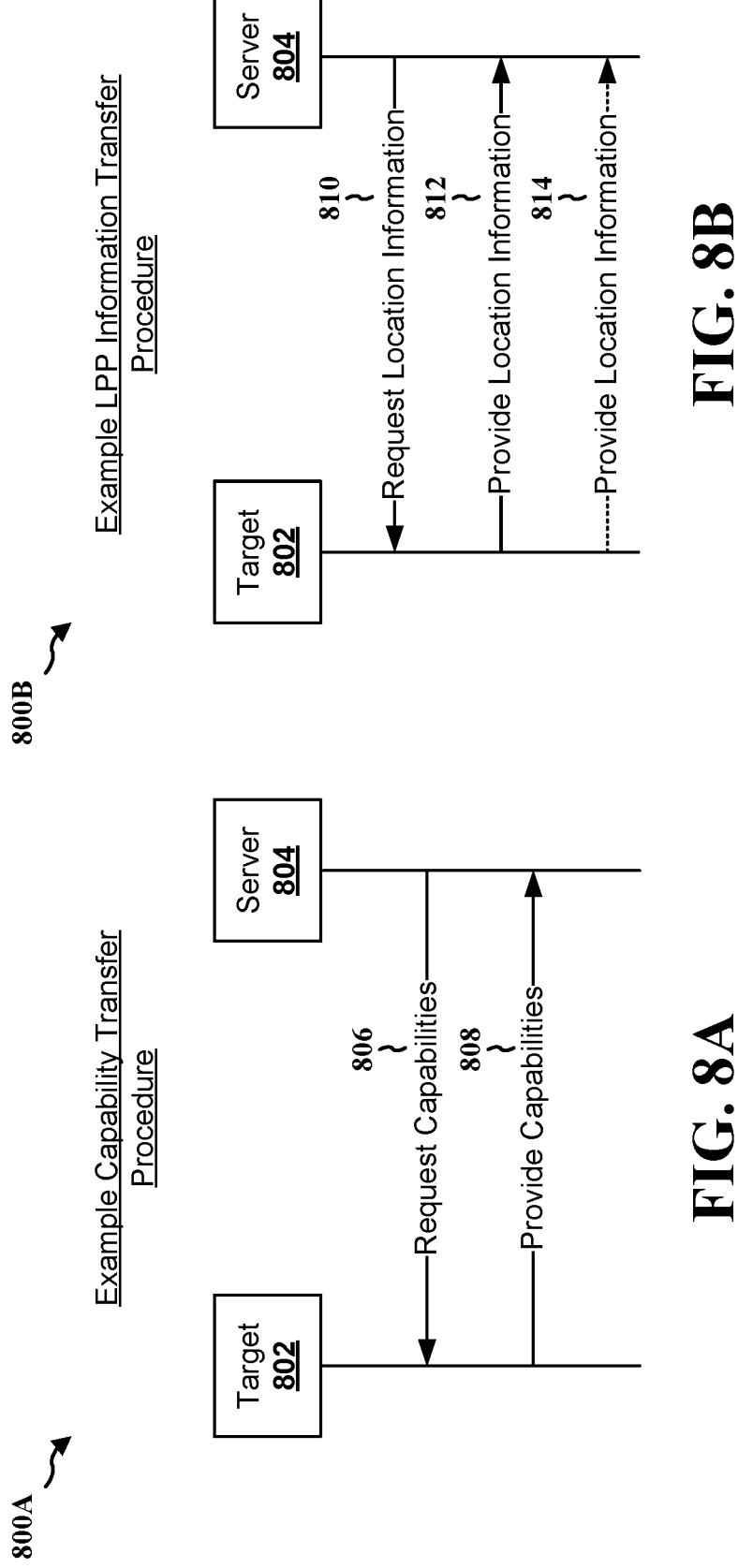
FIG. 8A is a diagram illustrating an example capability transfer procedure that may be used for reporting beam squint information of a target to a server in accordance with various aspects of the present disclosure.
FIG. 8B is a diagram illustrating an example LTE positioning protocol (LPP) location information transfer procedure that may be used for reporting beam squint information of a target to a server in accordance with various aspects of the present disclosure.

FIG. 8A is a diagram 800A illustrating an example capability transfer procedure that may be used for reporting beam squint information of a target to a server in accordance with various aspects of the present disclosure. As shown at 806, a server 804 (e.g., a location server, an LMF, etc.) may request a target 802 (e.g., a UE, a TRP, etc.) to provide beam squint information (e.g., bulk beam squint information or individual beam squint information) of the target 802 using capability messaging (e.g., by sending the request via a request capabilities message). In response, as shown at 808, the target 802 may indicate its beam squint information (e.g., for available TX and/or RX beam(s)) to the server 804, such as via a provide capabilities message. The request for the beam squint information of the target 802 may apply to both Tx and Rx beams of the target 802. For example, if the UE positioning session is associated with AoA-based positioning, the server 804 may request the target 802 (e.g., a UE) to provide beam squint information for the Tx beam(s) of the target 802. On the other hand, if the UE positioning session is associated with AoD-based positioning, the server 804 may request the target 802 (e.g., a UE) to provide beam squint information for the Rx beam(s) of the target 802, etc.

FIG. 8B is a diagram 800B illustrating an example LPP location information transfer procedure that may be used for reporting beam squint information of a target to a server in accordance with various aspects of the present disclosure. As shown at 810, the server 804 may also request the target 802 to provide beam squint information (e.g., bulk beam squint information or individual beam squint information) of the target 802 using LPP location information transfer messaging (e.g., by sending the request via a request location information message). In response, as shown at 812, the target 802 may indicate beam squint information for the beam used by the target 802 in positioning to the server 804, such as via a provide location information message. In some examples, as shown at 814, the target 802 may provide the beam squint information via multiple messages (e.g., for different beams). For example, for AoD-based positioning, the target 802 (e.g., a UE) may provide beam squint information for an Rx beam it used for performing the AoD-based positioning.

In one example, as shown by a diagram 900A of FIG. 9A, the server 804 may request the target 802 to provide capabilities related to beam squint (e.g., the beam squint information) as part of the LPP capability transfer procedure (e.g., described in connection with FIG. 8B) using AoD related information elements (IEs), e.g., the IE NR-DL-AoD-RequestCapabilities. In another example, as shown by a diagram 900B of FIG. 9B, the server 804 may request the target 802 to provide capabilities related to beam squint as part of the LPP capability transfer procedure using dedicated (e.g., new) IEs, e.g., an IE NR-DL-BeamSquint-RequestCapabilities. In one example, the request from the server 804 may first inquire general capability description of the target 802 related to beam squint (e.g., whether the target 802 has the capability to indicate its beam squint information). In another example, the request may include a flag to notify the target 802 regarding whether the target 802 is specified to provide detailed capability response of beam squint information or wait for additional solicited requests. In addition, the server 804 may transmit further/additional requests to solicit certain/additional beam squint information/capabilities from the target 802 based on the target 802's response. In another example, the server 804 may also request/solicit beam squint information for beam(s) on specific frequencies. For example, the server 804 may request beam squint information of a given beam on a predefined raster of frequencies, and the target 802 may indicate beam squint information based on the requested raster.

In another example, as shown by a diagram 1000A of FIG. 10A, the target 802 may provide its beam squint information to the server 804 as part of the LPP capability transfer procedure (e.g., based on solicited capabilities) as described in connection with FIG. 8B. In another example, as shown by a diagram 1000B of FIG. 10B, the target 802 may provide its beam squint information to the server 804 as part of the LPP capability transfer procedure (e.g., based on unsolicited capabilities), where the target 802 may indicate an initial set of its beam squint information and wait for solicited capability requests from the server 804. In some examples, the beam squint information provided by the target 802 may be part of the IE nr-DL-AoD-ProvideCapabilities or a dedicated/new IE nr-DL-BeamSquint-ProvideCapabilities.

In another example, as shown by a diagram 1100 of FIG. 11, the server 804 may request the target 802 to conduct AoD-based positioning using a request message (e.g., using the IE NR-DL-AoD-ReportConfig-rxx) as part of the location information transfer procedure (e.g., described in connection with FIG. 8A) in which the request message may include a flag that triggers the target 802 to report amount of beam squint expected for a given measurement/beam (e.g., using an IE NR-DL-BeamSquint-RequestCapabilities).

In another example, as shown by a diagram 1200 of FIG. 12, the target 802 may conduct AoD-based positioning as requested and provide beam squint information of RX beam used for the positioning as part of a provide message (e.g., using the IE NR-DL-AoD-ProvideLocationInformation). In some examples, this provide message may include estimated angle related measurement along with beam squint information related to the Rx beam used by the target 802 for AoD related measurements.

Figure 13:
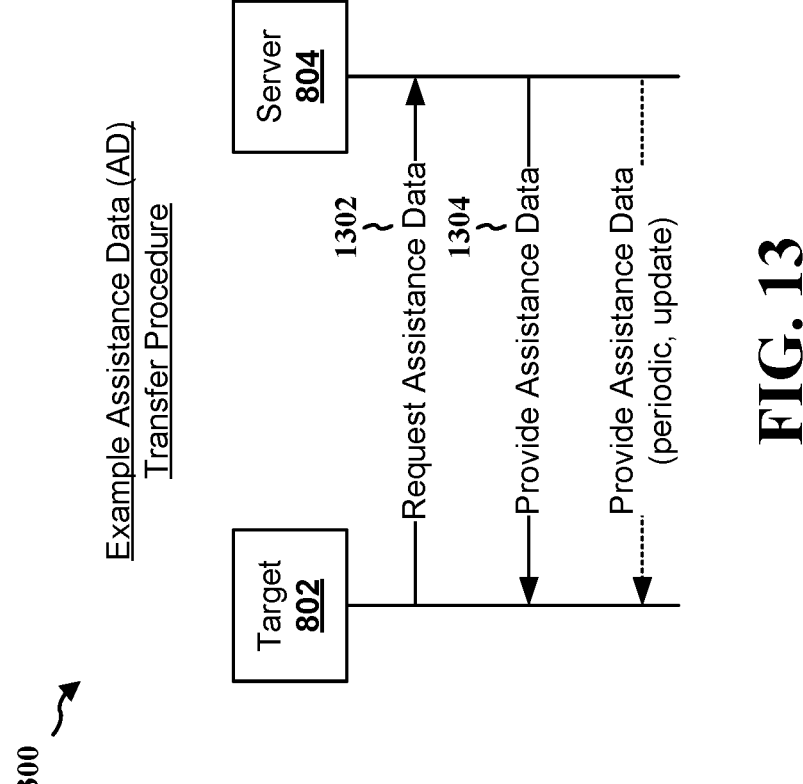
FIG. 13 is a diagram illustrating an example assistance data (AD) transfer procedure that may be used for indicating beam squint information of a transmission-reception point (TRP) to a target in accordance with various aspects of the present disclosure.

FIG. 13 is a diagram 1300 illustrating an example assistance data (AD) transfer procedure that may be used for indicating beam squint information of a TRP to a target (e.g., a UE) in accordance with various aspects of the present disclosure. In another aspect of the present disclosure, the server 804 may indicate beam squint information of a TRP to the target 802 (e.g., a UE) via assistance data. For example, as shown 1302, during a positioning session (for the target 802), the target 802 (e.g., the UE) may send a request for assistance data to the server 804, such as using a request assistance data message. At 1304, in response to the request, the server 804 may transmit assistance data to the target 802 for the positioning session, where the assistance data may include beam squint information of TRP(s)' Tx beam(s) that are used for the AoD positioning. The beam squint information may be bulk beam squint information (e.g., bulk PRS Tx beam squint information).

On the other hand, the server 804 may also indicate beam squint information for individual Tx beam of a TRP to the target 802 (e.g., a UE) via the LPP location information transfer procedure described in connection with FIG. 8B. For example, the server 804 may indicate individual Tx beam (which may also be referred to as PRS Tx beam) squint information of a TRP (or for multiple TRPs) as part of the request location information messaging shown at 810 (e.g., using IEs NR-DL-AoD-ReportConfig-r16, NR-DL-TX-BeamSquint-info, etc.). A benefit for the server 804 (e.g., an LMF) to indicate beam squint information of PRS Tx beam of TRP(s) to the target 802 is for letting the target 802 to perform a better estimation of AoD related measurements (e.g., more precise/accurate angle measurement may be obtained).

Figure 15:
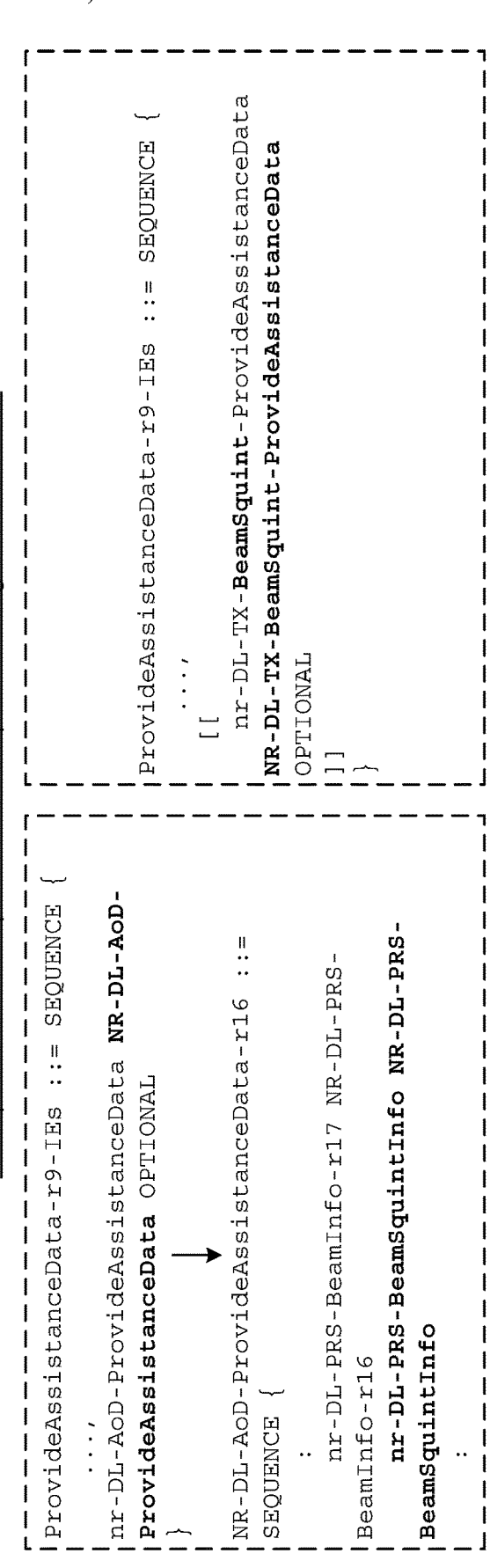
FIG. 15 is a diagram illustrating an example beam squint information messaging in accordance with various aspects of the present disclosure.

In one example, as shown by a diagram 1400 of FIG. 14, the target 802 may request the server 804 to provide assistance data related to PRS Tx beam squint information of one or more TRPs as part of the LPP assistance data transfer procedure shown at 1302 of FIG. 13, e.g., using the IE NR-DL-AoD-RequestAssistanceData or a dedicated/new IE NR-DL-TX-BeamSquint-RequestAssistanceData. In another example, as shown by a diagram 1500 of FIG. 15, the server 804 may provide the assistance data related to PRS Tx beam squint information of one or more TRPs as part of the LPP assistance data transfer or LPP assistance data delivery procedures shown at 1304 of FIG. 13, e.g., using the IE NR-DL-AoD)-ProvideAssistanceData or a dedicated/new IE NR-DL-TX-BeamSquint-Provide Assistance Data.

Figure 16:
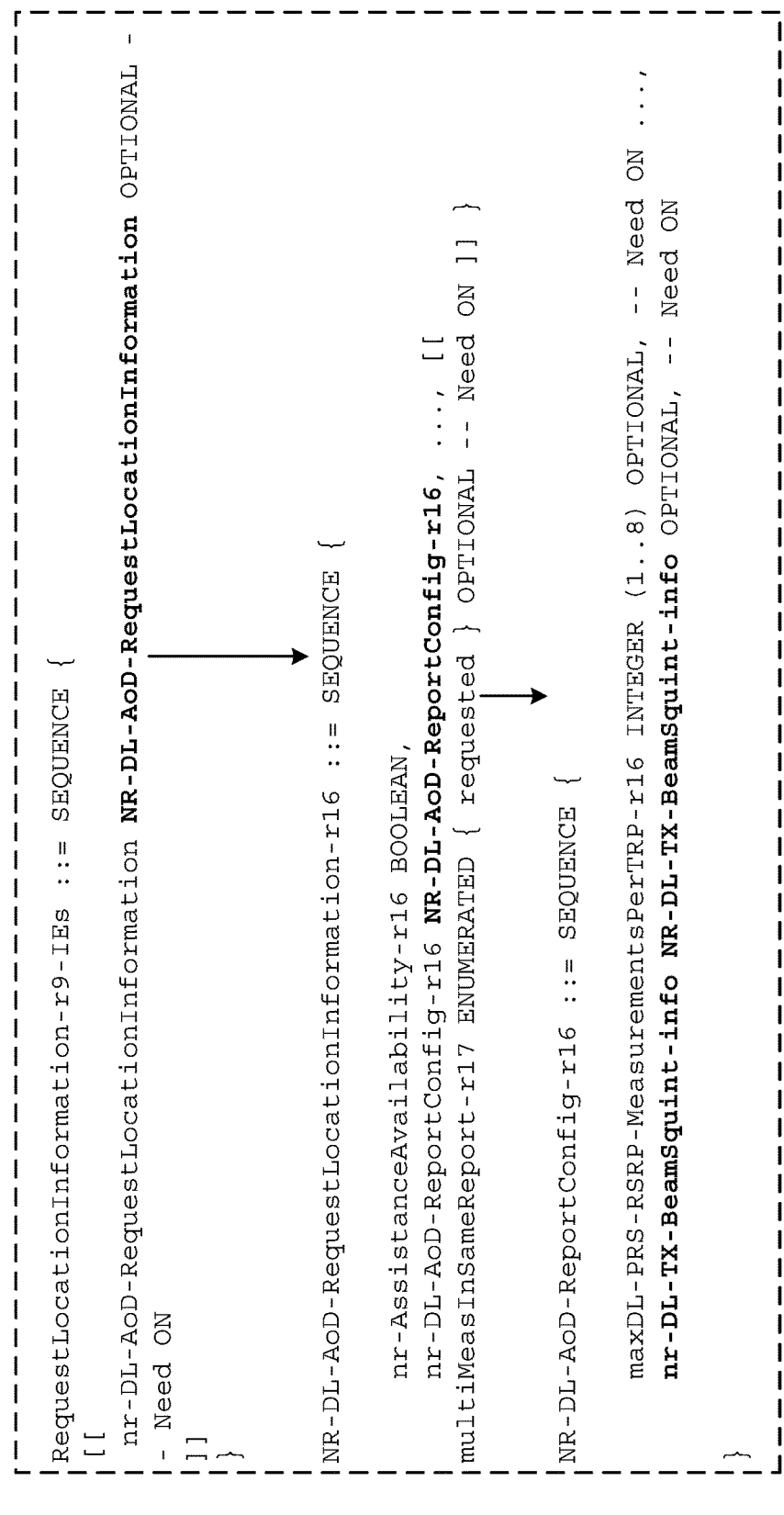
FIG. 16 is a diagram illustrating an example beam squint information messaging in accordance with various aspects of the present disclosure.

In another example, as shown by a diagram 1600 of FIG. 16, the server 804 may also provide individual PRS Tx beam squint information of a TRP to the target 802 as part of the LPP information transfer procedure (e.g., described in connection with FIG. 8B), such as using the IE RequestLocationInformation. For the server 804 to indicate the individual PRS Tx beam squint information of a TRP to the target 802, it may be assumed that the server 804 has knowledge about the PRS Tx beam used for the positioning.

Figure 17A:
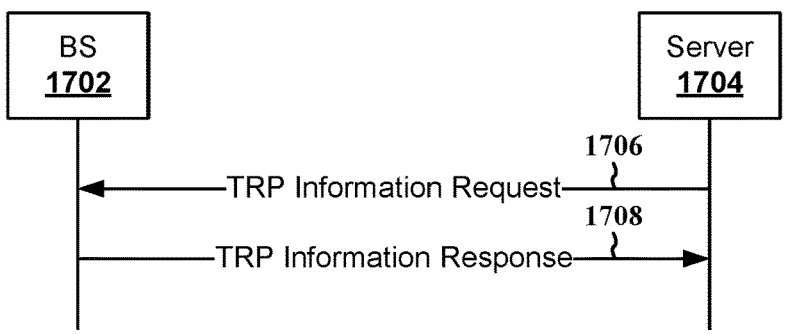
FIG. 17A is a diagram illustrating an example of a base station reporting its beam squint information to a server based on a TRP information exchange procedure in accordance with various aspects of the present disclosure.

In another aspect of the present disclosure, a base station (e.g., an NG-RAN node) may report its beam squint information (or beam squint information of its TRPs). FIG. 17A is a diagram 1700A illustrating an example of a base station reporting its beam squint information to a server (e.g., an LMF) based on a TRP information exchange procedure in accordance with various aspects of the present disclosure. As shown at 1706, a server 1704 (e.g., an LMF) may request a base station 1702 (e.g., an NG-RAN node) to provide beam squint information of the base station 1702 (e.g., for its TRPs), such as via a TRP information request message. At 1708, in response to the request, the base station 1702 may indicate to the server 1704 that the base station 1702 have beam squint information (e.g., bulk beam squint information) for its Tx beams and/or Rx beams available (e.g., Tx beams of the base station 1702 for AoD-based positioning, and Rx beams of the base station 1702 for AoA-based positioning, etc.).

Figure 17B:
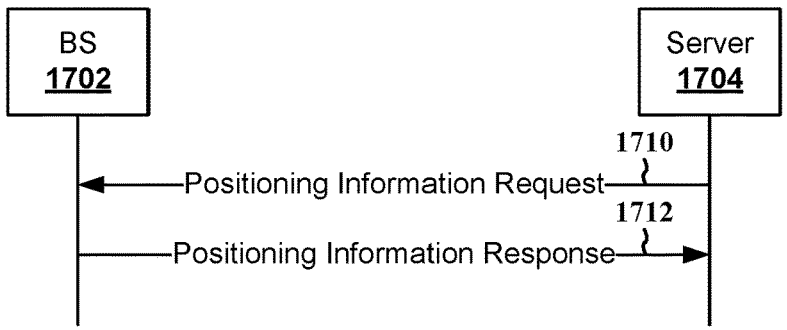
FIG. 17B is a diagram illustrating an example of a base station reporting its beam squint information to a server based on an NR positioning protocol A (NRPPa) position information exchange procedure in accordance with various aspects of the present disclosure.
Figure 17C:
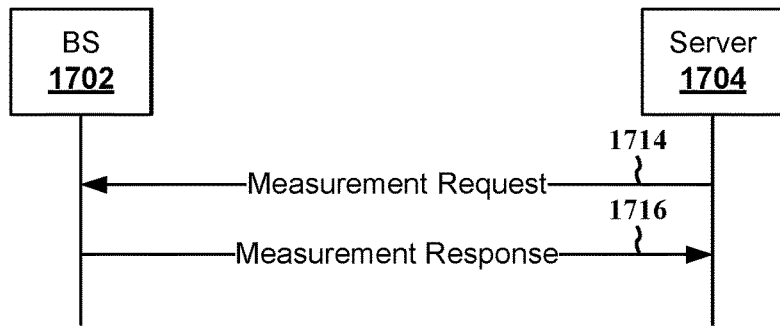
FIG. 17C is a diagram illustrating an example an example of a base station reporting its beam squint information to a server based on an NRPPa measurement information exchange procedure in accordance with various aspects of the present disclosure.

FIGS. 17B and 17C are diagrams 1700B and 1700C illustrating an example of a base station reporting its beam squint information to a server based on an NR positioning protocol A (NRPPa) position information exchange procedure or based on an NRPPa measurement information exchange procedure in accordance with various aspects of the present disclosure. In one example, at 1710 or 1714, the server 1704 may request the base station 1702 to conduct/perform AoA-based positioning or to perform measurement for a positioning (e.g., AoA related measurement), such as using a positioning information request message (e.g., for the NRPPa position information exchange procedure) or using a measurement request message (e.g., for the NRPPa measurement information exchange procedure). In some examples, the request message may include a flag to trigger the base station 1702 for reporting the amount of beam squint expected for a given measurement.

As shown at 1712 and 1716, in response to the request, the base station 1702 may conduct AoA-based positioning as requested and provide beam squint information of Rx beam used for the positioning, such as using a positioning information response message or a measurement response. The response message may include estimated angle related measurement along with beam squint information related to the Rx beam used for AoA related measurement.

In one example, as shown by a diagram 1800 of FIG. 18, the server 1704 may request the base station 1702 to provide capabilities related to beam squint as part of the NRPPa TRP information exchange procedure (e.g., discussed in connection with FIG. 17A), such as using a TRP information request messaging (e.g., via the IE TRPInformationTypeItem). In one example, the request may first inquire general capability description from the base station 1702 (e.g., whether the base station 1702 has the capability to indicate its beam squint information). In another example, the request may include a flag to notify the base station 1702 whether the base station 1702 node is specified to provide detailed capability response of beam squint information or wait for additional solicited requests. In some examples, the server 1704 may send further/additional requests to the base station 1702 to solicit certain beam squint capabilities based on the response of the base station 1702. In addition, the server 1704 may request beam squint information of a given beam on a predefined raster of frequencies, and the base station 1702 may indicate beam squint information at the requested raster in response.

In another example, as shown by a diagram 1900 of FIG. 19, the base station 1702 may provide its beam squint information to the server 1704 as part of the NRPPa TRP information exchange procedure (e.g., discussed in connection with FIG. 17A) via a TRP information response message, such as using IEs TRP Information Type Response Item-ExtIE's (e.g., TRPBeamSquintInformation).

Figure 20:
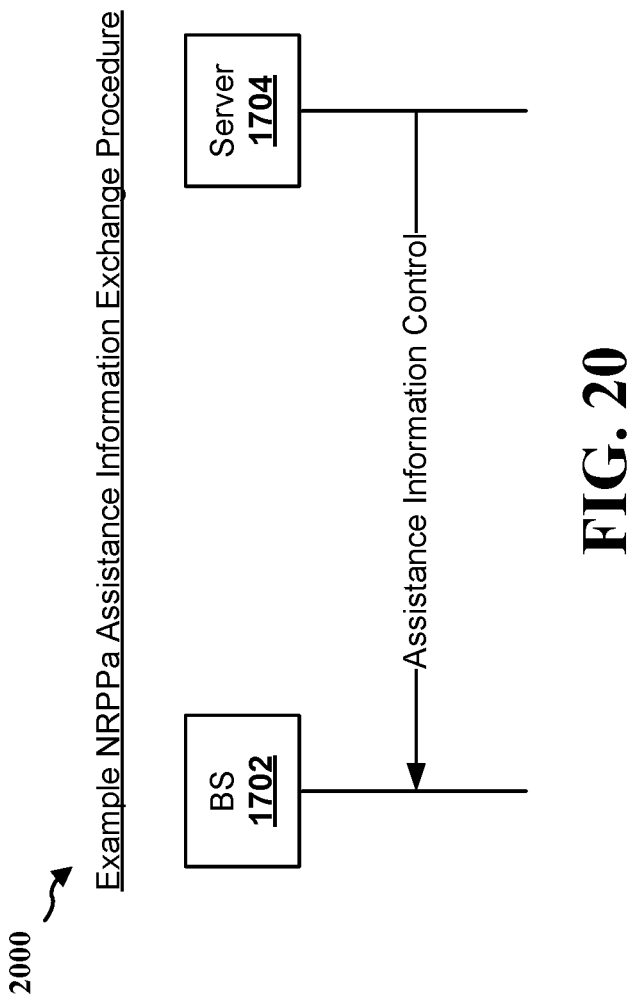
FIG. 20 is a diagram illustrating an example of a server providing beam squint information of a UE to a base station based on an NRPPa assistance information exchange procedure in accordance with various aspects of the present disclosure.

In another aspect of the present disclosure, the server 1704 (e.g., an LMF) may also provide the base station 1702 with beam squint information of a target's (e.g., a UE, the target 802, etc.) Tx beam used for AoA-based positioning (which may also be referred to as SRS Tx beam). In one example, as shown by a diagram 2000 of FIG. 20, the server 1704 may send beam squint information (e.g., bulk SRS Tx beam squint information) associated with a target (e.g., a UE, the target 802) to the base station 1702 based on an NRPPa assistance information exchange procedure (e.g., via an assistance information control message). For example, as shown by a diagram 2100 of FIG. 21, the server 1704 may provide assistance information related to SRS Tx beam squint information of a target as part of NRPPa assistance information transfer procedure, such as using the IEs AssistanceInformationControl-IEs NRPPA-PROTOCOL-IES.

In another example, the server 1704 may transmit individual SRS Tx beam squint information (or a target) to the base station 1702 as part of the positioning information request messaging or the measurement request messaging discussed in connection with FIGS. 17B and 17C. For example, as shown by a diagram 2200 of FIG. 22, the server 1704 may provide SRS Tx beam squint information of a target (e.g., a UE) via a positioning information request message (e.g., using an IE id-Measurement-AoA-TX-Beam-SquintInfo). As shown by a diagram 2300 of FIG. 23, the server 1704 may also provide SRS Tx beam squint information of a target via measurement request message (e.g., using an IE id-Measurement-AoA-TX-BeamSquintInfo). It may be beneficial for the server 1704 to indicate SRS Tx beam information to the base station 1702 as it may enable the base station 1702 to perform a better estimation of AoA related measurements.

After the beam squint information associated with a UE and/or a TRP (or a base station) is exchanged between positioning entities (e.g., the UE, the base station, the location server, etc.), as discussed in connection with FIGS. 8A, 8B, 13, 17A, 17B, 17C, and 20, the positioning entities may perform or participate a positioning session for the UE based on the beam squint information, such as communicating using or with Tx/Rx beams associated with the beam squint information, and/or modifying relevant positioning measurements (e.g., AoA measurement, AoD measurement, etc.) based on the beam squint information. For example, a measured angle for AoA/AoD-based positioning may be adjusted based on the beam squint information available.

FIG. 24 is a flowchart 2400 of a method of wireless communication. The method may be performed by a network node (e.g., the UE 104, 604, 702; the base station 102, 1702; the target 802; the apparatus 2604). The method may enable the network node to provide its beam squint information and/or receive beam squint information of another positioning entity to improve the accuracy and reliability of UE positioning.

At 2402, the network node may obtain beam squint information associated with a set of beams of the network node under a plurality of center frequencies, such as described in connection with FIG. 7. For example, as discussed in connection with 708 and 710 of FIG. 7, the UE 702 may obtain its beam squint information based on a spherical measurement test, where the beam squint information may be stored at the memory/storage of the UE or at a server (e.g., as a look-up table). The obtaining of the beam squint information may be performed by, e.g., the beam squint information exchange component 198, the application processor 2606, the cellular baseband processor 2624, and/or the transceiver(s) 2622 of the apparatus 2604 in FIG. 26.

In one example, the beam squint information for each beam in the set of beams may include at least one of: a set of equivalent isotropic radiated power (EIRP) measurements for the plurality of center frequencies under different angles, a first difference between the set of EIRP measurements of a reference center frequency in the plurality of center frequencies and one or more non-reference center frequencies in the plurality of center frequencies under the different angles, an angle of a maximum EIRP measurement for each center frequency in the plurality of center frequencies, a second difference between angles of maximum EIRP measurements of the reference center frequency in the plurality of center frequencies and the one or more non-reference center frequencies in the plurality of center frequencies, or a combination thereof. In another example, the beam squint information for one or more beams in the set of beams may be obtained based on interpolation.

In another example, as shown at 2408, the beam squint information may be stored in a memory or a storage of the network node, and to obtain the beam squint information, the network node may load the beam squint information for the at least one beam in the set of beams from the memory or the storage of the network node.

In another example, the set of beams may include one or more Tx beams, one or more Rx beams, or a combination thereof.

At 2404, the network node may transmit, for a network entity, the beam squint information for at least one beam of the set of beams for a positioning session, such as described in connection with FIGS. 8A, 8B, 13, 17A, 17B, 17C, and 20. For example, as discussed in connection with 808 of FIG. 8A, the target 802 may transmit its beam squint information for at least one of its beams to the server 804 based on a capability transfer procedure associated with UE positioning. The transmission of the beam squint information may be performed by, e.g., the beam squint information exchange component 198, the application processor 2606, the cellular baseband processor 2624, and/or the transceiver(s) 2622 of the apparatus 2604 in FIG. 26.

In one example, as shown at 2410, to transmit the beam squint information for the at least one beam of the set of beams, the network node may receive, from the network entity, a request to provide the beam squint information via a capability request message, and the network node may transmit, for the network entity, the beam squint information for one or more beams in the set of beams via a capability indication message in response to the capability request message. In some implementations, the capability request message and the capability indication message may be associated with at least one of a capability transfer procedure or a capability indication procedure.

In one example, as shown at 2412, to transmit the beam squint information for the at least one beam of the set of beams, the network node may receive, from the network entity, a request to perform the positioning session via a request message, and the network node may transmit, for the network entity via a provide message, the beam squint information for one or more beams in the set of beams that are to be used for the positioning session. In some implementations, the request message and the provide message may be associated with a location information transfer procedure.

At 2406, the network node may participate, based on the beam squint information via the at least one beam, in the positioning session with the network entity, such as described in connection with FIGS. 8A, 8B, 13, 17A, 17B, 17C, and 20. For example, after the target 802 provides its beam squint information, the target 802 may perform UE positioning using a beam that is provided in the beam squint information. The participation of the positioning session may be performed by, e.g., the beam squint information exchange component 198, the application processor 2606, the cellular baseband processor 2624, and/or the transceiver(s) 2622 of the apparatus 2604 in FIG. 26.

In one example, the network node may be a UE, and the network node may receive, from the network entity, second beam squint information associated with at least one Tx beam of at least one TRP associated with the positioning session. In some implementations, the second beam squint information may be received via assistance data or a request location information message. In some implementations, if the positioning session is associated with AoD positioning, the network node may receive a set of PRSs from the at least one Tx beam of the at least one TRP, and the network node may estimate the AoD for the set of PRSs based on the second beam squint information.

In another example, the network node may be a base station and the network entity may be a location server or an LMF, and the network node may receive, from the location server or the LMF, a request to provide the beam squint information via a TRP information request message, and the network node may transmit, for the location server or the LMF, the beam squint information for one or more beams in the set of beams via a TRP information response message in response to the TRP information request message. In some implementations, the TRP information request message and the TRP information response message may be associated with a TRP information exchange procedure.

In another example, the network node may be a base station and the network entity may be a location server or an LMF, the network node may receive, from the location server or the LMF, a request to perform the positioning session via a request message, and the network node may transmit, for the network entity via a provide message, the beam squint information for one or more beams in the set of beams that are to be used for the positioning session. In some implementations, the request message and the provide message may be associated with a position information exchange procedure or a measurement information exchange procedure. In some implementations, the positioning session may be associated with AoA positioning and the one or more beams in the set of beams may include a set of Rx beams for the base station.

In another example, the network node is a base station and the network entity is a location server or an LMF, the network entity may receive, from the location server or the LMF, second beam squint information associated with at least one transmission Tx beam of a UE associated with the positioning session. In some implementations, the second beam squint information may be received via an assistance information control message associated with an assistance information exchange procedure or via a positioning information request message associated with a position information request message associated with a position information exchange procedure. In some implementations, the positioning session may be associated with AoA positioning, the network node may receive a set of SRSs from the at least one Tx beam of the UE, and the network node may estimate the AoA for the set of SRSs based on the second beam squint information.

FIG. 25 is a flowchart 2500 of a method of wireless communication. The method may be performed by a network node (e.g., the UE 104, 604, 702; the base station 102, 1702; the target 802; the apparatus 2604). The method may enable the network node to provide its beam squint information and/or receive beam squint information of another positioning entity to improve the accuracy and reliability of UE positioning.

At 2502, the network node may obtain beam squint information associated with a set of beams of the network node under a plurality of center frequencies, such as described in connection with FIG. 7. For example, as discussed in connection with 708 and 710 of FIG. 7, the UE 702 may obtain its beam squint information based on a spherical measurement test, where the beam squint information may be stored at the memory/storage of the UE or at a server (e.g., as a look-up table). The obtaining of the beam squint information may be performed by, e.g., the beam squint information exchange component 198, the application processor 2606, the cellular baseband processor 2624, and/or the transceiver(s) 2622 of the apparatus 2604 in FIG. 26.

In one example, the beam squint information for each beam in the set of beams may include at least one of: a set of EIRP measurements for the plurality of center frequencies under different angles, a first difference between the set of EIRP measurements of a reference center frequency in the plurality of center frequencies and one or more non-reference center frequencies in the plurality of center frequencies under the different angles, an angle of a maximum EIRP measurement for each center frequency in the plurality of center frequencies, a second difference between angles of maximum EIRP measurements of the reference center frequency in the plurality of center frequencies and the one or more non-reference center frequencies in the plurality of center frequencies, or a combination thereof. In another example, the beam squint information for one or more beams in the set of beams may be obtained based on interpolation.

In another example, the beam squint information may be stored in a memory or a storage of the network node, and to obtain the beam squint information, the network node may load the beam squint information for the at least one beam in the set of beams from the memory or the storage of the network node.

In another example, the set of beams may include one or more Tx beams, one or more Rx beams, or a combination thereof.

At 2504, the network node may transmit, for a network entity, the beam squint information for at least one beam of the set of beams for a positioning session, such as described in connection with FIGS. 8A, 8B, 13, 17A, 17B, 17C, and 20. For example, as discussed in connection with 808 of FIG. 8A, the target 802 may transmit its beam squint information for at least one of its beams to the server 804 based on a capability transfer procedure associated with UE positioning. The transmission of the beam squint information may be performed by, e.g., the beam squint information exchange component 198, the application processor 2606, the cellular baseband processor 2624, and/or the transceiver(s) 2622 of the apparatus 2604 in FIG. 26.

In one example, to transmit the beam squint information for the at least one beam of the set of beams, the network node may receive, from the network entity, a request to provide the beam squint information via a capability request message, and the network node may transmit, for the network entity, the beam squint information for one or more beams in the set of beams via a capability indication message in response to the capability request message. In some implementations, the capability request message and the capability indication message may be associated with at least one of a capability transfer procedure or a capability indication procedure.

In one example, to transmit the beam squint information for the at least one beam of the set of beams, the network node may receive, from the network entity, a request to perform the positioning session via a request message, and the network node may transmit, for the network entity via a provide message, the beam squint information for one or more beams in the set of beams that are to be used for the positioning session. In some implementations, the request message and the provide message may be associated with a location information transfer procedure.

At 2506, the network node may participate, based on the beam squint information via the at least one beam, in the positioning session with the network entity, such as described in connection with FIGS. 8A, 8B, 13, 17A, 17B, 17C, and 20. For example, after the target 802 provides its beam squint information, the target 802 may perform UE positioning using a beam that is provided in the beam squint information. The participation of the positioning session may be performed by, e.g., the beam squint information exchange component 198, the application processor 2606, the cellular baseband processor 2624, and/or the transceiver(s) 2622 of the apparatus 2604 in FIG. 26.

In one example, the network node may be a UE, and the network node may receive, from the network entity, second beam squint information associated with at least one Tx beam of at least one TRP associated with the positioning session. In some implementations, the second beam squint information may be received via assistance data or a request location information message. In some implementations, if the positioning session is associated with AoD positioning, the network node may receive a set of PRSs from the at least one Tx beam of the at least one TRP, and the network node may estimate the AoD for the set of PRSs based on the second beam squint information.

In another example, the network node may be a base station and the network entity may be a location server or an LMF, and the network node may receive, from the location server or the LMF, a request to provide the beam squint information via a TRP information request message, and the network node may transmit, for the location server or the LMF, the beam squint information for one or more beams in the set of beams via a TRP information response message in response to the TRP information request message. In some implementations, the TRP information request message and the TRP information response message may be associated with a TRP information exchange procedure.

In another example, the network node may be a base station and the network entity may be a location server or an LMF, the network node may receive, from the location server or the LMF, a request to perform the positioning session via a request message, and the network node may transmit, for the network entity via a provide message, the beam squint information for one or more beams in the set of beams that are to be used for the positioning session. In some implementations, the request message and the provide message may be associated with a position information exchange procedure or a measurement information exchange procedure. In some implementations, the positioning session may be associated with AoA positioning and the one or more beams in the set of beams may include a set of Rx beams for the base station.

In another example, the network node is a base station and the network entity is a location server or an LMF, the network entity may receive, from the location server or the LMF, second beam squint information associated with at least one transmission Tx beam of a UE associated with the positioning session. In some implementations, the second beam squint information may be received via an assistance information control message associated with an assistance information exchange procedure or via a positioning information request message associated with a position information exchange procedure. In some implementations, the positioning session may be associated with AoA positioning, the network node may receive a set of SRSs from the at least one Tx beam of the UE, and the network node may estimate the AoA for the set of SRSs based on the second beam squint information.

Figure 26:
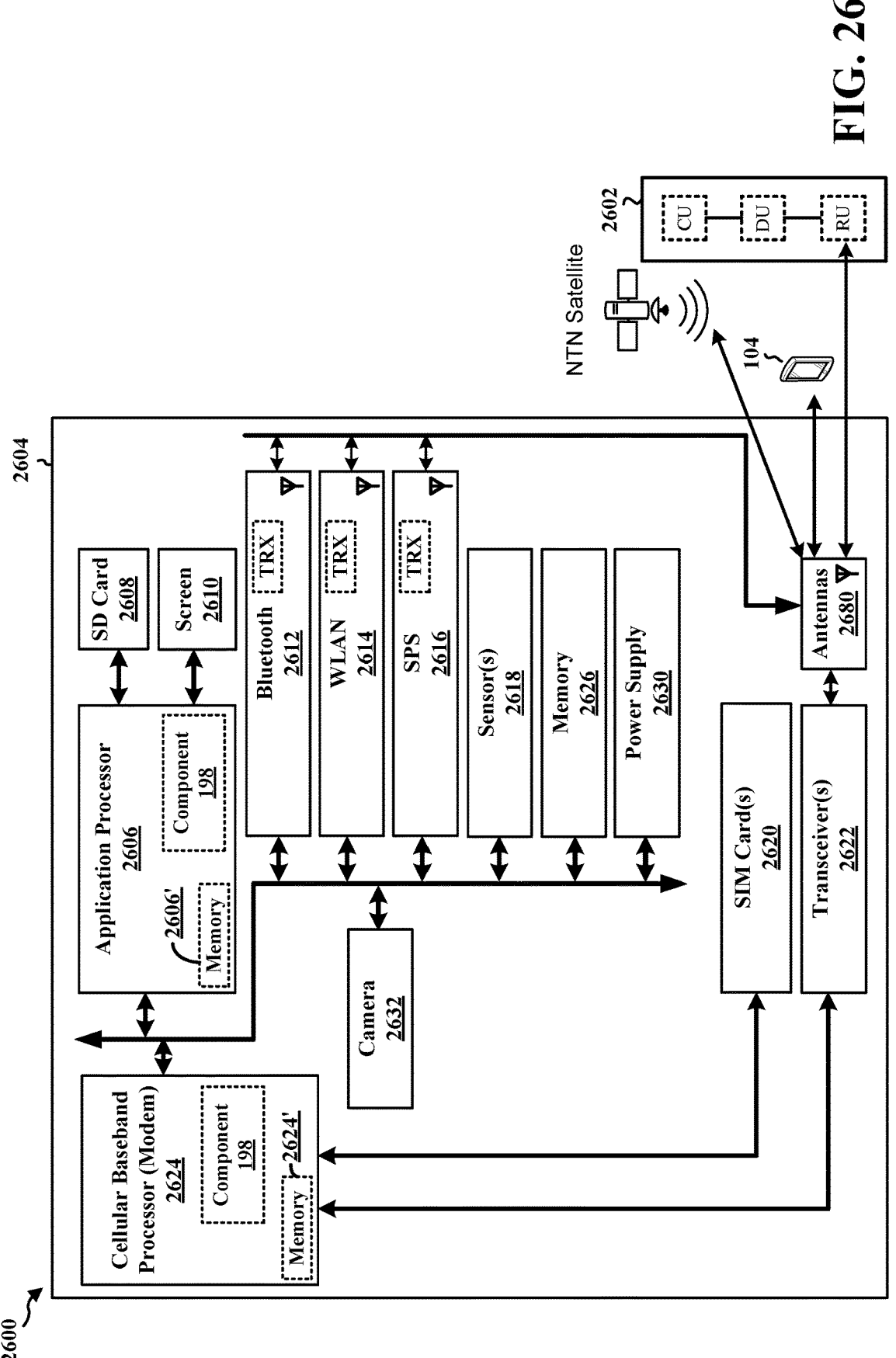
FIG. 26 is a diagram illustrating an example of a hardware implementation for an example apparatus and/or network entity.

FIG. 26 is a diagram 2600 illustrating an example of a hardware implementation for an apparatus 2604. The apparatus 2604 may be a UE, a component of a UE, or may implement UE functionality. In some aspects, the apparatus 2604 may include a cellular baseband processor 2624 (also referred to as a modem) coupled to one or more transceivers 2622 (e.g., cellular RF transceiver). The cellular baseband processor 2624 may include on-chip memory 2624'. In some aspects, the apparatus 2604 may further include one or more subscriber identity modules (SIM) cards 2620 and an application processor 2606 coupled to a secure digital (SD) card 2608 and a screen 2610. The application processor 2606 may include on-chip memory 2606'. In some aspects, the apparatus 2604 may further include a Bluetooth module 2612, a WLAN module 2614, an SPS module 2616 (e.g., GNSS module), one or more sensor modules 2618 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 2626, a power supply 2630, and/or a camera 2632. The Bluetooth module 2612, the WLAN module 2614, and the SPS module 2616 may include an on-chip transceiver (TRX) (or in some cases, just a receiver (RX)). The Bluetooth module 2612, the WLAN module 2614, and the SPS module 2616 may include their own dedicated antennas and/or utilize the antennas 2680 for communication. The cellular baseband processor 2624 communicates through the transceiver(s) 2622 via one or more antennas 2680 with the UE 104 and/or with an RU associated with a network entity 2602. The cellular baseband processor 2624 and the application processor 2606 may each include a computer-readable medium/memory 2624', 2606', respectively. The additional memory modules 2626 may also be considered a computer-readable medium/memory. Each computer-readable medium/memory 2624', 2606', 2626 may be non-transitory. The cellular baseband processor 2624 and the application processor 2606 are each responsible for general processing, including the execution of software stored on the computer-readable medium/memory. The software, when executed by the cellular baseband processor 2624/application processor 2606, causes the cellular baseband processor 2624/application processor 2606 to perform the various functions described supra. The computer-readable medium/ memory may also be used for storing data that is manipulated by the cellular baseband processor 2624/application processor 2606 when executing software. The cellular baseband processor 2624/application processor 2606 may be a component of the UE 350 and may include the memory 360 and/or at least one of the TX processor 368, the RX processor 356, and the controller/processor 359. In one configuration, the apparatus 2604 may be a processor chip (modem and/or application) and include just the cellular baseband processor 2624 and/or the application processor 2606, and in another configuration, the apparatus 2604 may be the entire UE (e.g., see UE 350 of FIG. 3) and include the additional modules of the apparatus 2604.

As discussed supra, the beam squint information exchange component 198 may be configured to obtain beam squint information associated with a set of beams of the network node under a plurality of center frequencies. The beam squint information exchange component 198 may also be configured to transmit, for a network entity, the beam squint information for at least one beam of the set of beams for a positioning session. The beam squint information exchange component 198 may also be configured to partici-pate, based on the beam squint information via the at least one beam, in the positioning session with the network entity. The beam squint information exchange component 198 may be within the cellular baseband processor 2624, the appli-cation processor 2606, or both the cellular baseband pro-cessor 2624 and the application processor 2606. The beam squint information exchange component 198 may be one or more hardware components specifically configured to carry out the stated processes/algorithm, implemented by one or more processors configured to perform the stated processes/ algorithm, stored within a computer-readable medium for implementation by one or more processors, or some com-bination thereof. As shown, the apparatus 2604 may include a variety of components configured for various functions. In one configuration, the apparatus 2604, and in particular the cellular baseband processor 2624 and/or the application processor 2606, may include means for obtaining beam squint information associated with a set of beams of the network node under a plurality of center frequencies. The apparatus 2604 may further include means for transmitting, for a network entity, the beam squint information for at least one beam of the set of beams for a positioning session. The apparatus 2604 may further include means for participating, based on the beam squint information via the at least one beam, in the positioning session with the network entity.

In one configuration, the beam squint information for each beam in the set of beams may include at least one of: a set of EIRP measurements for the plurality of center frequencies under different angles, a first difference between the set of EIRP measurements of a reference center fre-quency in the plurality of center frequencies and one or more non-reference center frequencies in the plurality of center frequencies under the different angles, an angle of a maxi-mum EIRP measurement for each center frequency in the plurality of center frequencies, a second difference between angles of maximum EIRP measurements of the reference center frequency in the plurality of center frequencies and the one or more non-reference center frequencies in the plurality of center frequencies, or a combination thereof. In another configuration, the beam squint information for one or more beams in the set of beams may be obtained based on interpolation.

In another configuration, the beam squint information may be stored in a memory or a storage of the apparatus 2604, and the means for obtaining the beam squint infor-mation may include configuring the apparatus 2604 to load the beam squint information for the at least one beam in the set of beams from the memory or the storage of the appa-ratus 2604.

In another configuration, the set of beams may include one or more Tx beams, one or more Rx beams, or a combination thereof.

In another configuration, the means for transmitting the beam squint information for the at least one beam of the set of beams may include configuring the apparatus 2604 to receive, from the network entity, a request to provide the beam squint information via a capability request message, and transmit, for the network entity, the beam squint infor-mation for one or more beams in the set of beams via a capability indication message in response to the capability request message. In some implementations, the capability request message and the capability indication message may be associated with at least one of a capability transfer procedure or a capability indication procedure.

In one configuration, the means for transmitting the beam squint information for the at least one beam of the set of beams may include configuring the apparatus 2604 to receive, from the network entity, a request to perform the positioning session via a request message, and transmit, for the network entity via a provide message, the beam squint information for one or more beams in the set of beams that are to be used for the positioning session. In some imple-mentations, the request message and the provide message may be associated with a location information transfer procedure.

In another configuration, the apparatus 2604 may be a UE, and the apparatus 2604 may further include means for receiving, from the network entity, second beam squint information associated with at least one Tx beam of at least one TRP associated with the positioning session. In some implementations, the second beam squint information may be received via assistance data or a request location infor-mation message. In some implementations, if the position-ing session is associated with AoD positioning, the appara-tus 2604 may further include means for receiving a set of PRSs from the at least one Tx beam of the at least one TRP, and means for estimating the AoD for the set of PRSs based on the second beam squint information.

In another configuration, the apparatus 2604 may be a base station and the network entity may be a location server or an LMF, and the apparatus 2604 may further include means for receiving, from the location server or the LMF, a request to provide the beam squint information via a TRP information request message, and means for transmitting, for the location server or the LMF, the beam squint infor-mation for one or more beams in the set of beams via a TRP information response message in response to the TRP infor-mation request message. In some implementations, the TRP information request message and the TRP information response message may be associated with a TRP information exchange procedure.

In another configuration, the apparatus 2604 may be a base station and the network entity may be a location server or an LMF, the apparatus 2604 may further include means for receiving, from the location server or the LMF, a request to perform the positioning session via a request message, and means for transmitting, for the network entity via a provide message, the beam squint information for one or more beams in the set of beams that are to be used for the positioning session. In some implementations, the request message and the provide message may be associated with a position information exchange procedure or a measurement information exchange procedure. In some implementations, the positioning session may be associated with AoA posi-tioning and the one or more beams in the set of beams may include a set of Rx beams for the base station.

In another configuration, the apparatus 2604 is a base station and the network entity is a location server or an LMF, the apparatus 2604 may further include means for receiving, from the location server or the LMF, second beam squint information associated with at least one transmission Tx beam of a UE associated with the positioning session. In some implementations, the second beam squint information may be received via an assistance information control message associated with an assistance information exchange procedure or via a positioning information request message associated with a position information exchange procedure. In some implementations, the positioning session may be associated with AoA positioning, the apparatus 2604 may further include means for receiving a set of SRSs from the at least one Tx beam of the UE, and means for estimating the AoA for the set of SRSs based on the second beam squint information.

The means may be the beam squint information exchange component 198 of the apparatus 2604 configured to perform the functions recited by the means. As described supra, the apparatus 2604 may include the TX processor 368, the RX processor 356, and the controller/processor 359. As such, in one configuration, the means may be the TX processor 368, the RX processor 356, and/or the controller/processor 359 configured to perform the functions recited by the means.

FIG. 27 is a flowchart 2700 of a method of wireless communication. The method may be performed by a network entity (e.g., the one or more location servers 168; the server 804, 1704; the network entity 2960). The method may enable the network entity to receive beam squint information from one or more positioning entities and/or to transmit beam squint information of one positioning entity to another positioning entity to improve the accuracy and reliability of UE positioning.

At 2702, the network entity may receive, from a network node, beam squint information associated with at least one beam of a set of beams of the network node for a positioning session, such as described in connection with FIGS. 8A, 8B, 13, 17A, 17B, 17C, and 20. For example, as discussed in connection with 808 of FIG. 8A, the server 804 may receive beam squint information associated with at least one beam of a set of beams of the target 802 for a positioning session. The reception of the beam squint information may be performed by, e.g., the beam squint information exchange component 197 and/or the network interface 2980 of the network entity 2960 in FIG. 29.

At 2704, the network entity may participate, based on the beam squint information via the at least one beam, in the positioning session with the network node, such as described in connection with FIGS. 8A, 8B, 13, 17A, 17B, 17C, and 20. For example, after the server 804 receives beam squint information from the target 802, the server 804 may perform UE positioning or positioning measurements based on the beam squint information. The reception of the beam squint information may be performed by, e.g., the beam squint information exchange component 197 and/or the network interface 2980 of the network entity 2960 in FIG. 29.

In one example, the beam squint information for each beam in the set of beams may include at least one of: a set of EIRP measurements for a plurality of center frequencies under different angles, a first difference between the set of EIRP measurements of a reference center frequency in the plurality of center frequencies and one or more non-reference center frequencies in the plurality of center frequencies under the different angles, an angle of a maximum EIRP measurement for each center frequency in the plurality of center frequencies, a second difference between angles of maximum EIRP measurements of the reference center frequency in the plurality of center frequencies and the one or more non-reference center frequencies in the plurality of center frequencies, or a combination thereof.

In another example, as shown at 2706, to receive the beam squint information for the at least one beam of the set of beams, the network entity may transmit, for the network node, a request to provide the beam squint information via a capability request message, and the network entity may receive, from the network node, the beam squint information for one or more beams in the set of beams via a capability indication message in response to the capability request message.

In another example, as shown at 2708, to receive the beam squint information for the at least one beam of the set of beams, the network entity may transmit, for the network node, a request to perform the positioning session via a request message; and receive, from the network node via a provide message, the beam squint information for one or more beams in the set of beams that are to be used for the positioning session.

In another example, the network node is a UE, the network entity may transmit, to the UE, second beam squint information associated with at least one Tx beam of at least one TRP associated with the positioning session.

In another example, the network node is a base station and the network entity is a location server or an LMF, the network entity may transmit, for the base station, a request to provide the beam squint information via a TRP information request message, and the network entity may receive, from the base station, the beam squint information for one or more beams in the set of beams via a TRP information response message in response to the TRP information request message.

In another example, the network node is a base station and the network entity is a location server or an LMF, the network entity may transmit, for the base station, a request to perform the positioning session via a request message, and the network entity may receive, from the base station via a provide message, the beam squint information for one or more beams in the set of beams that are to be used for the positioning session.

In another example, the network node may be a base station and the network entity may be a location server or an LMF, the network entity may transmit, for the base station, second beam squint information associated with at least one Tx beam of a UE associated with the positioning session.

Figure 28:
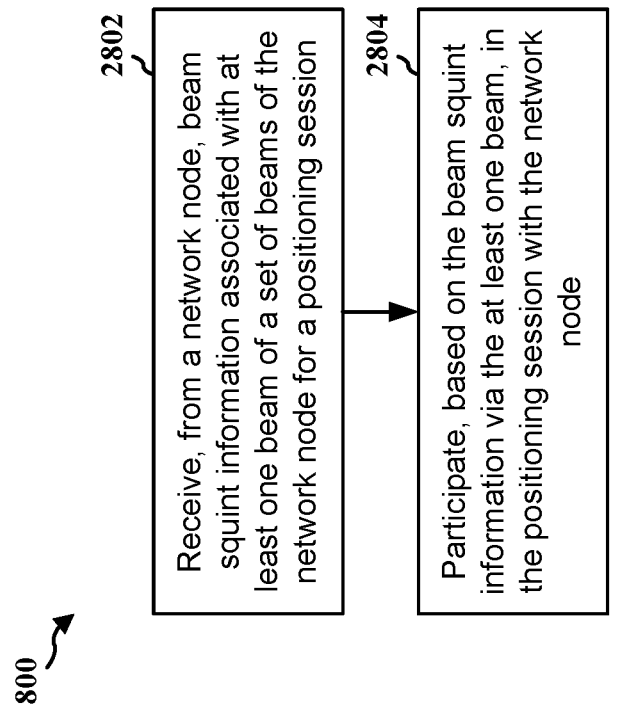
FIG. 28 is a flowchart of a method of wireless communication.

FIG. 28 is a flowchart 2800 of a method of wireless communication. The method may be performed by a network entity (e.g., the one or more location servers 168; the server 804, 1704; the network entity 2960). The method may enable the network entity to receive beam squint information from one or more positioning entities and/or to transmit beam squint information of one positioning entity to another positioning entity to improve the accuracy and reliability of UE positioning.

At 2802, the network entity may receive, from a network node, beam squint information associated with at least one beam of a set of beams of the network node for a positioning session, such as described in connection with FIGS. 8A, 8B, 13, 17A, 17B, 17C, and 20. For example, as discussed in connection with 808 of FIG. 8A, the server 804 may receive beam squint information associated with at least one beam of a set of beams of the target 802 for a positioning session. The reception of the beam squint information may be performed by, e.g., the beam squint information exchange component 197 and/or the network interface 2980 of the network entity 2960 in FIG. 29.

At 2804, the network entity may participate, based on the beam squint information via the at least one beam, in the positioning session with the network node, such as described in connection with FIGS. 8A, 8B, 13, 17A, 17B, 17C, and 20. For example, after the server 804 receives beam squint information from the target 802, the server 804 may perform UE positioning or positioning measurements based on the beam squint information. The reception of the beam squint information may be performed by, e.g., the beam squint information exchange component 197 and/or the network interface 2980 of the network entity 2960 in FIG. 29.

In one example, the beam squint information for each beam in the set of beams may include at least one of: a set of EIRP measurements for a plurality of center frequencies under different angles, a first difference between the set of EIRP measurements of a reference center frequency in the plurality of center frequencies and one or more non-reference center frequencies in the plurality of center frequencies under the different angles, an angle of a maximum EIRP measurement for each center frequency in the plurality of center frequencies, a second difference between angles of maximum EIRP measurements of the reference center frequency in the plurality of center frequencies and the one or more non-reference center frequencies in the plurality of center frequencies, or a combination thereof.

In another example, to receive the beam squint information for the at least one beam of the set of beams, the network entity may transmit, for the network node, a request to provide the beam squint information via a capability request message, and the network entity may receive, from the network node, the beam squint information for one or more beams in the set of beams via a capability indication message in response to the capability request message.

In another example, to receive the beam squint information for the at least one beam of the set of beams, the network entity may transmit, for the network node, a request to perform the positioning session via a request message; and receive, from the network node via a provide message, the beam squint information for one or more beams in the set of beams that are to be used for the positioning session.

In another example, the network node is a UE, the network entity may transmit, to the UE, second beam squint information associated with at least one Tx beam of at least one TRP associated with the positioning session.

In another example, the network node is a base station and the network entity is a location server or an LMF, the network entity may transmit, for the base station, a request to provide the beam squint information via a TRP information request message, and the network entity may receive, from the base station, the beam squint information for one or more beams in the set of beams via a TRP information response message in response to the TRP information request message.

In another example, the network node is a base station and the network entity is a location server or an LMF, the network entity may transmit, for the base station, a request to perform the positioning session via a request message, and the network entity may receive, from the base station via a provide message, the beam squint information for one or more beams in the set of beams that are to be used for the positioning session.

In another example, the network node may be a base station and the network entity may be a location server or an LMF, the network entity may transmit, for the base station, second beam squint information associated with at least one Tx beam of a UE associated with the positioning session.

Figure 29:
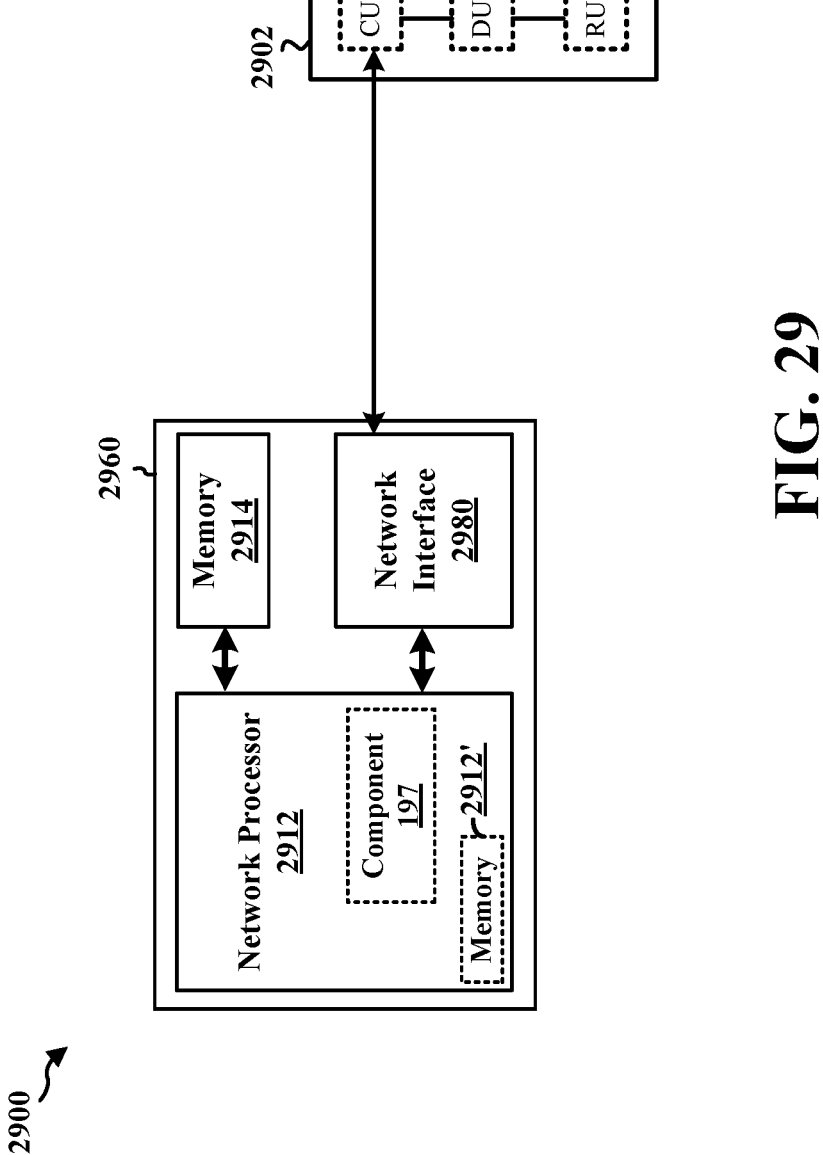
FIG. 29 is a diagram illustrating an example of a hardware implementation for an example network entity.

FIG. 29 is a diagram 2900 illustrating an example of a hardware implementation for a network entity 2960. In one example, the network entity 2960 may be within the core network 120. The network entity 2960 may include a network processor 2912. The network processor 2912 may include on-chip memory 2912'. In some aspects, the network entity 2960 may further include additional memory modules

2914. The network entity 2960 communicates via the network interface 2980 directly (e.g., backhaul link) or indirectly (e.g., through a RIC) with the CU 2902. The on-chip memory 2912' and the additional memory modules 2914 may each be considered a computer-readable medium/memory. Each computer-readable medium/memory may be non-transitory. The processor 2912 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the beam squint information exchange component 197 may be configured to receive, from a network node, beam squint information associated with at least one beam of a set of beams of the network node for a positioning session. The beam squint information exchange component 197 may also be configured to participate, based on the beam squint information via the at least one beam, in the positioning session with the network node. The beam squint information exchange component 197 may be within the processor 2912. The beam squint information exchange component 197 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 2960 may include a variety of components configured for various functions. In one configuration, the network entity 2960 may include means for receiving, from a network node, beam squint information associated with at least one beam of a set of beams of the network node for a positioning session. The network entity 2960 may further include means for participating, based on the beam squint information via the at least one beam, in the positioning session with the network node.

In one configuration, the beam squint information for each beam in the set of beams may include at least one of: a set of EIRP measurements for a plurality of center frequencies under different angles, a first difference between the set of EIRP measurements of a reference center frequency in the plurality of center frequencies and one or more non-reference center frequencies in the plurality of center frequencies under the different angles, an angle of a maximum EIRP measurement for each center frequency in the plurality of center frequencies, a second difference between angles of maximum EIRP measurements of the reference center frequency in the plurality of center frequencies and the one or more non-reference center frequencies in the plurality of center frequencies, or a combination thereof.

In another configuration, the means for receiving the beam squint information for the at least one beam of the set of beams may include configuring the network entity 2960 to transmit, for the network node, a request to provide the beam squint information via a capability request message, and receive, from the network node, the beam squint information for one or more beams in the set of beams via a capability indication message in response to the capability request message.

In another configuration, the means for receiving the beam squint information for the at least one beam of the set of beams may include configuring the network entity 2960 to transmit, for the network node, a request to perform the positioning session via a request message; and receive, from the network node via a provide message, the beam squint information for one or more beams in the set of beams that are to be used for the positioning session.

In another configuration, the network node is a UE, the network entity 2960 may further include means for trans- mitting, to the UE, second beam squint information associated with at least one Tx beam of at least one TRP associated with the positioning session.

In another configuration, the network node is a base station and the network entity is a location server or an LMF, the network entity 2960 may further include means for transmitting, for the base station, a request to provide the beam squint information via a TRP information request message, and means for receiving, from the base station, the beam squint information for one or more beams in the set of beams via a TRP information response message in response to the TRP information request message.

In another configuration, the network node is a base station and the network entity is a location server or an LMF, the network entity 2960 may further include means for transmitting, for the base station, a request to perform the positioning session via a request message, and means for receiving, from the base station via a provide message, the beam squint information for one or more beams in the set of beams that are to be used for the positioning session.

In another configuration, the network node may be a base station and the network entity may be a location server or an LMF, the network entity 2960 may further include means for transmitting, for the base station, second beam squint information associated with at least one Tx beam of a UE associated with the positioning session.

The means may be the beam squint information exchange component 197 of the network entity 2960 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. A device configured to "output" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a network node, including: obtaining beam squint information associated with a set of beams of the network node under a plurality of center frequencies; transmitting, for a network entity, the beam squint information for at least one beam of the set of beams for a positioning session; and participating, based on the beam squint information via the at least one beam, in the positioning session with the network entity.

Aspect 2 is the method of aspect 1, where the beam squint information for each beam in the set of beams includes at least one of: a set of EIRP measurements for the plurality of center frequencies under different angles, a first difference between the set of EIRP measurements of a reference center frequency in the plurality of center frequencies and one or more non-reference center frequencies in the plurality of center frequencies under the different angles, an angle of a maximum EIRP measurement for each center frequency in the plurality of center frequencies, a second difference between angles of maximum EIRP measurements of the reference center frequency in the plurality of center frequencies and the one or more non-reference center frequencies in the plurality of center frequencies, or a combination thereof.

Aspect 3 is the method of aspect 2, where the beam squint information for one or more beams in the set of beams is obtained based on interpolation.

Aspect 4 is the method of any of aspects 1 to 3, where the beam squint information is stored in a memory or a storage of the network node, and where obtaining the beam squint information includes: loading the beam squint information for the at least one beam in the set of beams from the memory or the storage of the network node.

Aspect 5 is the method of any of aspects 1 to 4, where transmitting the beam squint information for the at least one beam of the set of beams includes: receiving, from the network entity, a request to provide the beam squint information via a capability request message; and transmitting, for the network entity, the beam squint information for one or more beams in the set of beams via a capability indication message in response to the capability request message.

Aspect 6 is the method of aspect 5, where the capability request message and the capability indication message are associated with at least one of a capability transfer procedure or a capability indication procedure.

Aspect 7 is the method of any of aspects 1 to 6, where transmitting the beam squint information for the at least one beam of the set of beams includes: receiving, from the network entity, a request to perform the positioning session via a request message; and transmitting, for the network entity via a provide message, the beam squint information for one or more beams in the set of beams that are to be used for the positioning session.

Aspect 8 is the method of aspect 7, where the request message and the provide message are associated with a location information transfer procedure.

Aspect 9 is the method of any of aspects 1 to 8, where the set of beams includes one or more Tx beams, one or more Rx beams, or a combination thereof.

Aspect 10 is the method of any of aspects 1 to 9, where the network node is a UE, the method further including: receiving, from the network entity, second beam squint information associated with at least one Tx beam of at least one TRP associated with the positioning session.

Aspect 11 is the method of aspect 10, where the second beam squint information is received via assistance data or a request location information message.

Aspect 12 is the method of aspect 10, where the positioning session is associated with AoD positioning, the method further including: receiving a set of PRSs from the at least one Tx beam of the at least one TRP, and estimate the AoD for the set of PRSs based on the second beam squint information.

Aspect 13 is the method of any of aspects 1 to 12, where the network node is a base station and the network entity is a location server or an LMF, the method further including: receiving, from the location server or the LMF, a request to provide the beam squint information via a TRP information request message; and transmitting, for the location server or the LMF, the beam squint information for one or more beams in the set of beams via a TRP information response message in response to the TRP information request message.

Aspect 14 is the method of aspect 13, where the TRP information request message and the TRP information response message are associated with a TRP information exchange procedure.

Aspect 15 is the method of any of aspects 1 to 14, where the network node is a base station and the network entity is a location server or an LMF, the method further including: receiving, from the location server or the LMF, a request to perform the positioning session via a request message; and transmitting, for the network entity via a provide message, the beam squint information for one or more beams in the set of beams that are to be used for the positioning session.

Aspect 16 is the method of aspect 15, where the request message and the provide message are associated with a position information exchange procedure or a measurement information exchange procedure.

Aspect 17 is the method of aspect 15, where the positioning session is associated with AoA positioning and the one or more beams in the set of beams include a set of Rx beams for the base station.

Aspect 18 is the method of any of aspects 1 to 17, where the network node is a base station and the network entity is a location server or an LMF, the method further including: receiving, from the location server or the LMF, second beam squint information associated with at least one Tx beam of a UE associated with the positioning session.

Aspect 19 is the method of aspect 18, where the second beam squint information is received via an assistance information control message associated with an assistance information exchange procedure or via a positioning information request message associated with a position information exchange procedure.

Aspect 20 is the method of aspect 18, where the positioning session is associated with AoA positioning, the method further including: receiving a set of SRSs from the at least one Tx beam of the UE; and estimating the AoA for the set of SRSs based on the second beam squint information.

Aspect 21 is an apparatus for wireless communication at a network node, including: a memory; and at least one processor coupled to the memory and, based at least in part on information stored in the memory, the at least one processor is configured to implement any of aspects 1 to 20.

Aspect 22 is the apparatus of aspect 21, further including at least one of a transceiver or an antenna coupled to the at least one processor.

Aspect 23 is an apparatus for wireless communication including means for implementing any of aspects 1 to 20.

Aspect 24 is a computer-readable medium (e.g., a non-transitory computer-readable medium) storing computer executable code, where the code when executed by a processor causes the processor to implement any of aspects 1 to 20.

Aspect 25 is a method of wireless communication at a network entity, including: receiving, from a network node, beam squint information associated with at least one beam of a set of beams of the network node for a positioning session; and participating, based on the beam squint information via the at least one beam, in the positioning session with the network node.

Aspect 26 is the method of aspect 25, where the beam squint information for each beam in the set of beams includes at least one of: a set of EIRP measurements for a plurality of center frequencies under different angles, a first difference between the set of EIRP measurements of a reference center frequency in the plurality of center frequencies and one or more non-reference center frequencies in the plurality of center frequencies under the different angles, an angle of a maximum EIRP measurement for each center frequency in the plurality of center frequencies, a second difference between angles of maximum EIRP measurements of the reference center frequency in the plurality of center frequencies and the one or more non-reference center frequencies in the plurality of center frequencies, or a combination thereof.

Aspect 27 is the method of aspect 25 or 26, where receiving the beam squint information for the at least one beam of the set of beams includes: transmitting, for the network node, a request to provide the beam squint information via a capability request message; and receiving, from the network node, the beam squint information for one or more beams in the set of beams via a capability indication message in response to the capability request message.

Aspect 28 is the method of any of aspects 25 to 27, where receiving the beam squint information for the at least one beam of the set of beams includes: transmitting, for the network node, a request to perform the positioning session via a request message; and receiving, from the network node via a provide message, the beam squint information for one or more beams in the set of beams that are to be used for the positioning session.

Aspect 29 is the method of any of aspects 25 to 28, where the network node is a UE, the method further including: transmitting, to the UE, second beam squint information associated with at least one Tx beam of at least one TRP associated with the positioning session.

Aspect 30 is the method of any of aspects 25 to 29, where the network node is a base station and the network entity is a location server or an LMF, the method further including: transmitting, for the base station, a request to provide the beam squint information via a TRP information request message; and receiving, from the base station, the beam squint information for one or more beams in the set of beams via a TRP information response message in response to the TRP information request message.

Aspect 31 is the method of any of aspects 25 to 30, where the network node is a base station and the network entity is a location server or an LMF, the method further including: transmitting, for the base station, a request to perform the positioning session via a request message; and receiving, from the base station via a provide message, the beam squint information for one or more beams in the set of beams that are to be used for the positioning session.

Aspect 32 is the method of any of aspects 25 to 31, where the network node is a base station and the network entity is a location server or an LMF, the method further including: transmitting, for the base station, second beam squint information associated with at least one Tx beam of a UE associated with the positioning session.

Aspect 33 is an apparatus for wireless communication at a network entity, including: a memory; and at least one processor coupled to the memory and, based at least in part on information stored in the memory, the at least one processor is configured to implement any of aspects 25 to 32.

Aspect 34 is the apparatus of aspect 33, further including at least one of a transceiver or an antenna coupled to the at least one processor.

Aspect 35 is an apparatus for wireless communication including means for implementing any of aspects 25 to 32.

Aspect 36 is a computer-readable medium (e.g., a non-transitory computer-readable medium) storing computer executable code, where the code when executed by a processor causes the processor to implement any of aspects 25 to 32.

What is claimed is:

1. An apparatus for wireless communication at a user equipment (UE), comprising:
at least one memory; and
at least one processor coupled to the at least one memory, and the at least one processor is configured to:

obtain beam squint information associated with a set of beams of the UE under a plurality of center frequencies, wherein the beam squint information for each beam in the set of beams includes at least one of: a set of equivalent isotropic radiated power (EIRP) measurements for the plurality of center frequencies under different angles, a first difference between the set of EIRP measurements of a reference center frequency in the plurality of center frequencies and one or more non-reference center frequencies in the plurality of center frequencies under the different angles, an angle of a maximum EIRP measurement for each center frequency in the plurality of center frequencies, a second difference between angles of maximum EIRP measurements of the reference center frequency in the plurality of center frequencies and the one or more non-reference center frequencies in the plurality of center frequencies, or a combination thereof;
receive, from a network entity, a request to provide the beam squint information;
transmit, for the network entity based on the request, the beam squint information for one or more beams in the set of beams; and
perform, based on the beam squint information, positioning of the UE using at least one beam in the one or more beams.

2. The apparatus of claim 1, wherein to obtain the beam squint information, the at least one processor is configured to obtain the beam squint information for the one or more beams in the set of beams based on interpolation.

3. The apparatus of claim 1, wherein the at least one processor is further configured to store the beam squint information in the at least one memory or a storage of the UE, and wherein to obtain the beam squint information, the at least one processor is configured to:
load the beam squint information from the at least one memory or the storage of the UE.

4. The apparatus of claim 1, wherein to receive the request, the at least one processor is configured to receive the request via a capability request message, and wherein to transmit the beam squint information, the at least one processor is configured to transmit the beam squint information via a capability indication message.

5. The apparatus of claim 4, wherein the capability request message and the capability indication message are associated with at least one of a capability transfer procedure or a capability indication procedure.

6. The apparatus of claim 1, wherein the at least one processor is further configured to:
receive, from the network entity, a second request to perform the positioning of the UE via a request message, wherein to transmit the beam squint information, the at least one processor is configured to transmit the beam squint information via a provide message.

7. The apparatus of claim 6, wherein the request message and the provide message are associated with a location information transfer procedure.

8. The apparatus of claim 1, wherein the set of beams includes one or more transmission (Tx) beams, one or more reception (Rx) beams, or a combination thereof.

9. The apparatus of claim 1, wherein the at least one processor is further configured to:
receive, from the network entity, second beam squint information associated with at least one transmission (Tx) beam of at least one transmission-reception point (TRP) associated with the positioning of the UE.

10. The apparatus of claim 9, wherein to receive the second beam squint information, the at least one processor is configured to receive the second beam squint information via assistance data or a request location information message.

11. The apparatus of claim 9, wherein the positioning of the UE is associated with angle-of-departure (AoD) positioning, and wherein the at least one processor is further configured to:

receive a set of positioning reference signals (PRSs) from the at least one Tx beam of the at least one TRP; and estimate the AoD for the set of PRSs based on the second beam squint information.

12. An apparatus for wireless communication at a base station, comprising:

at least one memory; and at least one processor coupled to the at least one memory, and the at least one processor is configured to:

obtain beam squint information associated with a set of beams of the base station under a plurality of center frequencies;

receive, from a location server or a location management function (LMF), a request to provide the beam squint information via a transmission-reception point (TRP) information request message;

transmit, for the location server or the LMF based on the request and via a TRP information response message, the beam squint information for one or more beams in the set of beams; and perform, based on the beam squint information, positioning of a user equipment (UE) using at least one beam in the one or more beams.

13. The apparatus of claim 12, wherein the TRP information request message and the TRP information response message are associated with a TRP information exchange procedure.

14. An apparatus for wireless communication at a base station, comprising:

at least one memory; and at least one processor coupled to the at least one memory, and the at least one processor is configured to:

obtain beam squint information associated with a set of beams of the base station under a plurality of center frequencies;

receive, from a location server or a location management function (LMF), a request to perform positioning of a user equipment (UE) via a request message;

transmit, for the location server or the LMF via a provide message, the beam squint information for one or more beams in the set of beams that are to be used for the positioning of the UE; and perform, based on the beam squint information, the positioning of the UE using at least one beam in the one or more beams.

15. The apparatus of claim 14, wherein the request message and the provide message are associated with a position information exchange procedure or a measurement information exchange procedure.

16. The apparatus of claim 14, wherein the positioning of the UE is associated with angle-of-arrival (AoA) positioning and the one or more beams in the set of beams include a set of reception (Rx) beams for the base station.

17. An apparatus for wireless communication at a base station, comprising:

at least one memory; and at least one processor coupled to the at least one memory, and the at least one processor is configured to:

obtain beam squint information associated with a set of beams of the base station under a plurality of center frequencies;

receive, from a location server or a location management function (LMF), second beam squint information associated with at least one transmission (Tx) beam of a user equipment (UE) associated with positioning of the UE;

transmit, for the location server or the LMF, the beam squint information for one or more beams in the set of beams that are to be used for the positioning of the UE; and perform, based on the beam squint information and the second beam squint information, the positioning of the UE using at least one beam in the one or more beams.

18. The apparatus of claim 17, wherein to receive the second beam squint information the at least one processor is configured to receive the second beam squint information via an assistance information control message associated with an assistance information exchange procedure or via a positioning information request message associated with a position information exchange procedure.

19. The apparatus of claim 17, wherein the positioning of the UE is associated with angle-of-arrival (AoA) positioning, and wherein to perform, based on the second beam squint information, the positioning of the UE, the at least one processor is configured to:

receive a set of sounding reference signals (SRSs) from the at least one Tx beam of the UE; and estimate the AoA for the set of SRSs based on the second beam squint information.

* * * * *